United States Patent
Blatherwick et al.

(10) Patent No.: US 7,970,911 B2
(45) Date of Patent: Jun. 28, 2011

(54) METHOD, APPARATUS AND SYSTEM FOR MODULATING AN APPLICATION BASED ON PROXIMITY

(75) Inventors: Peter Blatherwick, Ottawa (CA); Thomas A. Gray, Mansfield (CA); N. Thomas Peiffer, Jr., Phoenix, AZ (US)

(73) Assignee: Mitel Networks Corporation, Ottawa, Ontario (CA)

( * ) Notice: Subject to any disclaimer, the term of this patent is extended or adjusted under 35 U.S.C. 154(b) by 66 days.

(21) Appl. No.: 12/157,890

(22) Filed: Jun. 13, 2008

(65) Prior Publication Data
US 2009/0177764 A1     Jul. 9, 2009

Related U.S. Application Data

(63) Continuation-in-part of application No. 12/006,651, filed on Jan. 4, 2008.

(51) Int. Cl.
*G06F 15/16* (2006.01)
(52) U.S. Cl. .................. 709/227; 709/228
(58) Field of Classification Search .......... 709/203, 709/227–228, 220–223
See application file for complete search history.

(56) References Cited

U.S. PATENT DOCUMENTS

| | | | |
|---|---|---|---|
| 6,377,987 B1 | 4/2002 | Kracht | |
| 6,823,188 B1 * | 11/2004 | Stern | 455/456.1 |
| 2004/0215781 A1 | 10/2004 | Pulsipher et al. | |
| 2006/0099967 A1 * | 5/2006 | Colvin et al. | 455/456.4 |
| 2007/0171098 A1 | 7/2007 | Basart | |
| 2007/0255807 A1 | 11/2007 | Hayashi | |
| 2007/0274234 A1 | 11/2007 | Kubota | |
| 2007/0282989 A1 * | 12/2007 | Milstein et al. | 709/223 |
| 2007/0297426 A1 | 12/2007 | Haveson et al. | |
| 2008/0215973 A1 * | 9/2008 | Zalewski et al. | 715/706 |

FOREIGN PATENT DOCUMENTS

| | | |
|---|---|---|
| EP | 1569384 A | 8/2005 |
| GB | 2363289 A | 12/2001 |
| WO | WO00/22860 A | 4/2000 |
| WO | WO2007121414 A | 12/2007 |

OTHER PUBLICATIONS

Amir, Arnon et al, Buddy tracking—efficient proximity detection among mobile friends; IEEE INFOCOM 2004; 0-7803-8356-7/04.

* cited by examiner

*Primary Examiner* — Salad Abdullahi

(57) ABSTRACT

A method, system and apparatus for modulating an application associated with at least one of a first communication device and a second communication device is provided. Proximity between the first communication device and the second communication device is determined. The application associated with at least one of the first communication device and the second communication device is modulated based on the proximity.

13 Claims, 7 Drawing Sheets

METHOD, APPARATUS AND SYSTEM FOR MODULATING AN APPLICATION BASED ON PROXIMITY

CROSS-REFERENCE TO RELATED APPLICATION

This application is a continuation-in-part of application Ser. No. 12/006,651, filed Jan. 4, 2008, and incorporated herein by reference

FIELD

The specification relates generally to networked devices, and specifically to a method, apparatus and system for modulating an application based on proximity.

BACKGROUND

Desktop devices, such as IP phones, thin clients, PCs/laptops often need onerous configuration in order to be associated with each other. For example, in order for an IP phone on a user's desk to be associated with a communication application running on a desktop PC/laptop on the same desk, the user or an administrator often needs to configure the application with the address or DN of the phone, the address of the phone's call controller, and other details. The user may likewise need to manually enter the IP address and other details of the PC into the phone. This is a complex process for the typical user, and is also both time consuming and error prone.

Alternatively, the same information may be configured into a centralized database, an application file or similar. This leads to a large ongoing administrative effort, especially in large systems, to keep data up to date as it changes over time.

Additionally, some configuration items such as IP addresses may change occasionally, causing the association to fail and the application to not work correctly. This leads to a further ongoing data maintenance issue, and/or to occasional application failures followed by re-doing the configuration.

US Patent Application US2007/0171098 discloses a system whereby associations may occur automatically via Ethernet links and IP addresses, however this solution suffers the same disadvantages as manual associations using IP addresses: IP addresses may change occasionally, causing the association to fail and applications to not work correctly. As well, the aforementioned application describes the association as being done by a high level protocol which is specific to the types of device described in it. The association created by such a protocol lacks the generality of the type of association described in this disclosure. The technology of this disclosure can be used by multiple types of devices to create arbitrary types of associations.

In cases where mobility is involved, the relationship between co-located devices is not long term (e.g. a user may bring a laptop to a conference room or telecommuting site, and wish to make temporary use of the desktop facilities such as the IP phone either alone or in relation to laptop-based application(s)). The configuration would need to be done again each time the user moves, and would need to be un-done at the end of a session so that resources can be reclaimed and future users cannot access the previous user's information. Again, this process is quite onerous for the end user, and error prone. Failing to log off could have security considerations.

BRIEF DESCRIPTIONS OF THE DRAWINGS

Embodiments are described with reference to the following figures, in which.

DETAILED DESCRIPTION OF THE EMBODIMENTS

Figure 1:
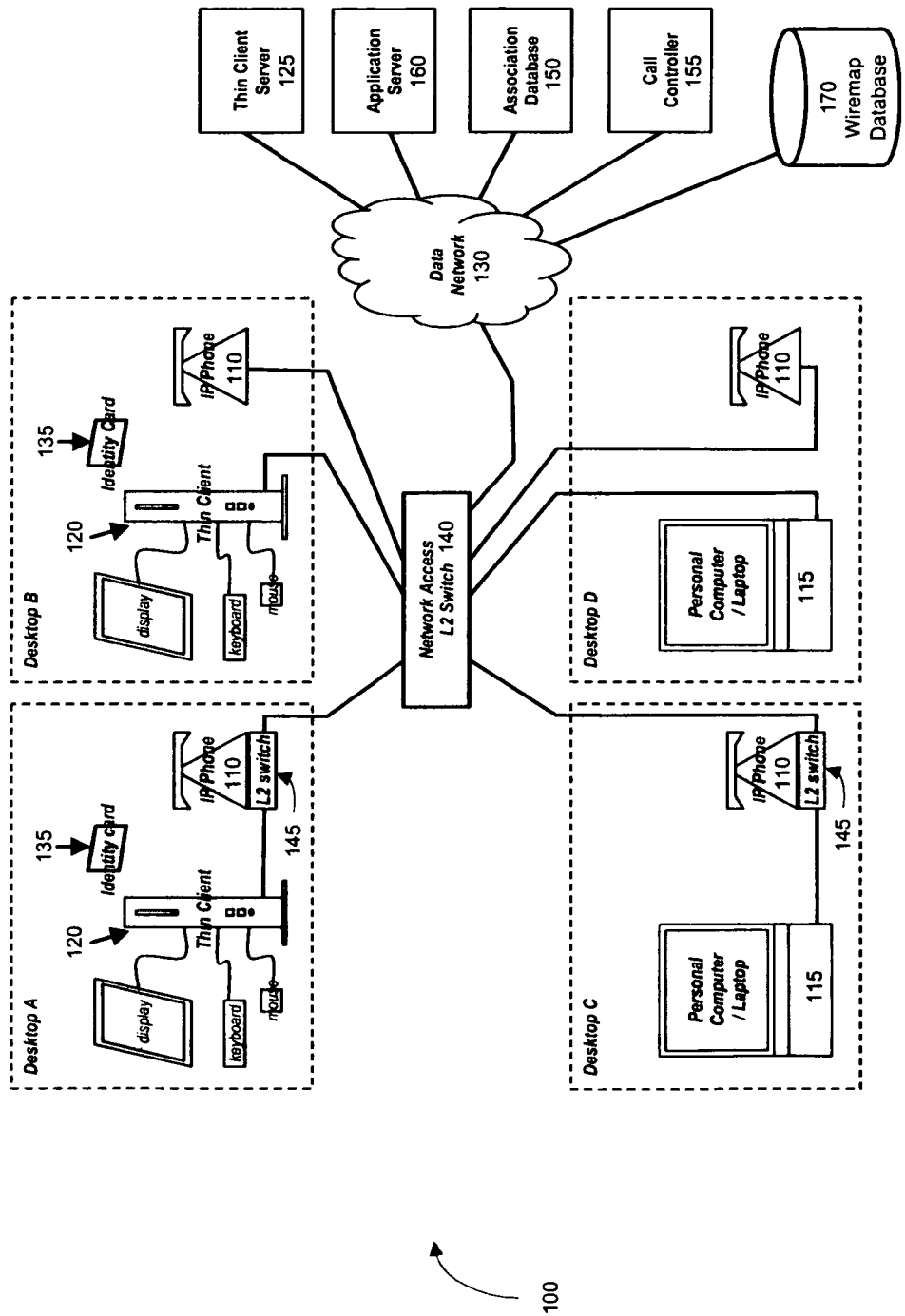
FIG. 1 depicts a system for associating networked communication devices, according to a non-limiting embodiment.

FIG. 1 depicts a system 100 for associating networked communication devices, according to a non-limiting embodiment. As shown in FIG. 1, there may be a number of end user desktops, each with a variety of co-located communication and/or computing devices available such as an IP phone 110, personal computer (PC) or laptop computer 115, or "thin client" devices 120. (A "thin client" would be understood by one of skill in the art to mean a collection of user interface devices, driven by a thin client processor device, with the actual applications running in a "thin client server" 125 elsewhere in the system. From a user perspective, the thin client 120 is equivalent to a personal computer, with the exception that the application is actually running remotely across a data network 130, and only the presentation of the application is being generated locally by the thin client device 120 and its peripherals (e.g. a display, a keyboard, a mouse etc,).

Some thin client implementations also make use of personal identity cards 135, memory keys, and the like, that identify a user to the thin client server 125 when inserted into the thin client device 120. Such identity cards 135 are also possible for use with the PC/laptops 115, other computing devices, or with communication devices such as IP phones 110.

These co-located desktop computing and/or communication devices (i.e. the thin client device 120, the IP phone 110, and/or the PC/laptop 115) are generally connected to the data network 130, such as a routed IP network, by way of some link-level connection such as Ethernet or wireless LAN. For the sake of simplicity, this is shown as a wired Ethernet connection to a network access layer 2 (L2) switch 140, which in turn connects the computing and/or communication devices to the data network 130. There are a variety of ways for these connections to be made, notably each communication device may be individually connected to the network infrastructure (Desktop B and D), or some communication devices such as PC/laptop 115 or thin client 120 may be connected through others such as IP phones (e.g. IP phone 110) comprising an embedded or attached L2 switch/bridge 145 (Desktop A and C). Additionally, these computing and/or communication devices may or may not be on the same IP subnet: that is they may be on different layer 2 VLANs, and hence may not be able to reach each other directly by use of broadcast. It is understood that computing devices which are communicating over the data network 130 comprise communication devices which enable this communication. Furthermore, communication devices will generally comprise a computing device to process the signals exchanged with the data network 130. Hence, in the following specification, the terms communication device and computing device are considered generally interchangeable, unless otherwise specified. For example, in some areas of the following description a distinction may be made between the IP phone 110, which functions primarily as a communication device, and the PC/laptop 115, or the thin client 120, either of which may function primarily as a computing device. Further references to a device are understood to mean, generically the communication and/or the computing device.

There are also in many cases servers in the network related to a communication device association process. Notable is some form of association database 150, for the purpose of tracking which communication devices are associated, their address and unique ID information, and any supplementary information as needed. In the IP phone case, there is often one or more call controller 155 (i.e. a server or servers) in the network. In these embodiments, the call controller 155 may perform the association task. In the case of thin clients on the desktop, there will also be the thin client server(s) 125 in the network. In addition, there may be one or more application servers 160, performing the association task, and possibly other applications. Note that these servers are logical entities, so they may or may not be physically integrated with each other, or with other servers in the network. Note also that while the data network 130 as depicted and described below comprises a routed IP network, this is not necessary—other protocols may be used, and a simple LAN is sufficient—as long as the communication devices and servers are reachable to each other through the networking infrastructure.

In order for applications to make use of co-located communication and/or computing devices in a unified way, the co-located devices need to be associated with each other: that is, the system 100 needs to know which of these devices are located physically together. An application that wants to perform some coordinated action on associated communication devices must also know (generally) the network addresses and unique identifiers of each.

Additionally, some or all of these communication and/or computing devices may be mobile in nature (for example laptops, PDAs, mobile phones or similar may move locations readily), and the communication devices may or may not be permanently associated with a particular user (e.g. the "desktop" may be shared by many users at various times such as in a teleworking site or automatic call distribution (ACD) agent shifts, or may be a conference room or other shared facility). Communication devices may also come and go dynamically for other reasons, such as being powered off or disconnected, or new communication devices being plugged in (e.g. plugging in a video camera to add to a conference). Thus, device associations need to be capable of being detected, established, updated and undone dynamically.

Standard link layer (or layer 2) protocols such as Link Layer Discovery Protocol (LLDP, IEEE 802.1AB-2005) or LLDP—Media Endpoint Discovery (LLDP-MED, ANSI/TIA-1057) provide considerable information to "neighbor" devices physically attached at each end of a network link. Information provided includes (not limited to) IP address and MAC address of the neighbor device, device capabilities (phone, network element, etc), device name and description, inventory description (vendor, make, model, software/firmware/hardware revision, etc). This information is highly useful to enable applications running in these devices, or running on their behalf elsewhere in the system, to associate themselves with each other.

In the case of IP phones, it is very often the case that the computing/communication device (i.e. desktop PC/laptop 115 or thin client 120) is physically plugged into the IP phone 110 directly, for example via a simple L2 switch/bridge 145, which may either be embedded in the IP phone 110 or connected to the IP phone 110. This makes it possible for a phone application to "sniff" the layer 2 protocol messages as they transit the IP phone 110 on their way between the attached computing/communication device and the network access switch infrastructure (i.e. network access L2 switch 140). Similar system configurations can be imagined in the case of the computing/communication device (or any other devices) comprising an embedded L2 switch/bridge 145 (or alternatively connected to an L2 switch/bridge 145) which other devices connect through, allowing these to also collect information contained in the layer 2 protocol. Additionally, any or all of the devices in these connection configurations may actively transmit the layer 2 protocol to each other over the link (as opposed to just passively passing it on from the upstream access switch), allowing the set of co-located communication devices to directly communicate.

This information, collected at both the IP phone 10 and the desktop PC/laptop 115 or thin client 120 can then be sent elsewhere in the overall system, such as to the call controller 155, a shared database (such as the association database 150) or the application server 160, where it can be collated, hence the related application running in the IP phone 110 (or the call controller 155) can be automatically configured with the required information about the corresponding computing/communication device, and visa versa. Alternatively, the information can also be gathered at the network infrastructure (e.g. at the network access layer 2 switching equipment) and collected from there or sent as an automatic notification to the other elements involved.

Additionally, specific physical location information can also be associated with the communication devices, such as civic address (city/street address/floor/room number), coordinate-based geographic location (latitude/longitude/altitude), or other locally relevant indices such as wiremap wall jack number, or similar. This information may be available (e.g.) as part of network access switch configuration (e.g. as part of LLDP-MED), through higher layer protocols (e.g. Dynamic Host Configuration Protocol (DHCP), HTTP Enabled Location Delivery (HELD)), through location technology in the devices (e.g. GPS, "beacons" etc), indirectly through a mapping process such as via a pre-populated wiremap database 170, or similar, or by direct configuration of one or more of the devices. Where this information can also be associated with the communication devices, location can also be used by applications as an index to find the set of co-located computing and/or communication devices at a particular location.

Using this provided information and other protocol facilities, a set of methods is possible that allow for the auto-discovery of device associations. Each is described separately below, using LLDP-MED as the reference protocol. However, the methods are not unduly limited by the reference protocol, and other protocols are within the scope of the present specification.

As an example application of this association, "a single sign-in logon" is described, wherein a user may login to one communication device (for example the PC/laptop 115 or the IP phone 110) and, as a result, be automatically logged into the other co-located communication devices as well. A non-limiting example of this may be inserting the thin client ID card 135 into the thin client 120, and as a result being "hot-desked" to the associated IP phone 110 as well, allowing a user to begin using both communication devices immediately without further action. However, this application is not to be considered unduly limiting and other applications that may benefit from the auto-discovery of device associations (some of which are discussed below) are within the scope of the present specification.

In general, there are a wide range of possible variations on the protocols used, specific system configuration, embedding of system components within others, and the specific applications enabled by the auto-association process. Hence, the following examples are not meant to be unduly limiting and variations on the described methods of auto-discovery of device associations are within the scope of the present specification.

Link Layer Discovery Via IP Phone

A method of associating at least two communication devices coupled to the data network is now discussed with reference to FIG. 2, which depicts a message diagram for associating networked communication devices, according to a non-limiting embodiment. In this method it is assumed that the computing/communication device (PC/laptop 115 or thin client 120) is connected to the data network 130 via the L2 switch/bridge 145 embedded in the IP phone 110. The Desktop A scenario of FIG. 1 is further referenced in the following discussion. The alternative Desktop C scenario, using the PC/laptop 115, is also described.

In this embodiment, LLDP-MED is in operation on both the desktop computing device (thin client 120 or PC/laptop 115), on the IP phone 110, as well as on the network access L2 switch 140.

Step 201. Using this protocol, both the computing device and the IP phone 110 are advertising their IP address and MAC address towards the network access L2 switch 140, and the network access L2 switch 140 is advertising its address and port MAC back towards the desktop devices (however, the latter is immaterial to this scenario). Additional supplementary information may also be transmitted, such as inventory information.

Step 201a. Since the IP phone's 110 embedded L2 switch/bridge 145 is passively in the path of the messaging from the computing device, it is able to "sniff" the messaging and extract the computing device's IP address and MAC address as well as any supplementary information provided in the protocol.

Step 202. The IP phones neighbour information, regarding the attached computing device, is passed to the IP phone's 110 registered call controller 155, along with any supplementary information in a "Neighbor_info" message.

Step 203. Since the IP phone's 110 call controller 155 already knows the IP phone's 110 IP address and MAC address (or other unique ID, see below), it is now able to collate this with the computing device's data, and sends an association message or equivalent to the association database 150, containing a mapping of computing device MAC address to IP phone MAC address (or other unique identifiers) and also the IP address of the computing device as well as of the IP phone ("Associate"). This association is stored in the association database 150 for later use by applications. At this point, the device association phase is complete, the physical device association is established, and may be used by applications to take higher-level actions. Hence, the call controller 155 effectively triggers the association between the devices by sending the association message.

Step 204. At some later time, a user inserts their identification card 135 into the computing device, or alternatively logs on to it in some other way (for example by supplying log-on credentials, such as a user name and password).

Step 205. In embodiments which comprise the thin client 120, this may result in a user login message or equivalent being sent to the thin client server 125, containing the user's user ID and the MAC address and/or IP address of the thin client 120 being accessed ("Login"). As a result, the user is logged into the thin client 120 and may begin using it.

Step 206. As a result of the login to the thin client 120, an event indicating the login occurring may be sent from the thin client server 125 to the application server 160 responsible for initiating the auto-login application to the associated IP phone 110 on the same desktop ("Login_event"). This message may contain the user's User ID, thin client MAC (or other unique ID) and possibly other data such as the thin client IP address, etc.

Step 207. The auto-login application running on the application server 160 then queries the association database 150, passing the computing device MAC (or other unique id) and possibly the user's User ID or other relevant data as keys ("Association_Query").

Step 208. The association database 150 returns the mapping of the computing device MAC to the IP phone MAC (or other unique ID pair), as previously stored in step 203 above, as well as the mapping of computing device User ID to the equivalent IP phone User ID (such as the user's personal DN ("UserDN")) ("Association_Query_response"). Other supplementary data related to one or both associated devices may also be returned.

Step 209. The auto-login application then sends a control message to the IP phone's call controller (or directly to the phone as applicable) requesting that the user be hotdesk logged into the associated IP phone, passing the IP phone MAC address (or other unique ID of the physical device), the user ID as known to the call controller (e.g. the user's hotdesk DN, or other unique user ID), and any other supplementary information needed to accomplish user login to the IP phone ("Phone_login").

Step 210. The user is auto-logged into the associated IP phone 110, and may begin using it.

Variation 1: Desktop C Scenario.

In embodiments where the computing device comprises the PC/laptop 115 (i.e. the Desktop C scenario), minor modifications to the message diagram of FIG. 2 may be as follows:

All corresponding messages would be sent and received by the PC/laptop 115 directly, rather than by the thin client server 125.

Messages described as between the thin client 120 and thin client server 125 would instead be internal to the PC/laptop 115.

Variation 2: Login to the IP Phone 110 First.

In embodiments where the user logs in to the IP phone 110 first, rather than the computing device, minor modifications to the message diagram of FIG. 2 may be as follows:

At steps 204 and 205: the user logs in (or inserts card 135 etc) at the IP phone 110.

At step 206: upon successful login, the call controller 155 sends the Login_event to the application server 160, containing the IP phone device ID (Phone MAC) and user ID (UserDN).

At steps 207-208: the application server 160 queries the association database 150, using the IP phone device ID (Phone MAC) and user ID (UserDN) as keys, and receives the thin client device ID (TC MAC) and user ID (UserID) in the response.

At steps 209-210: the application server 160 sends a login message to the thin client server 125, containing the user ID and thin client MAC, and thereby logging the user into the thin client 120.

Variation 3: The Computing Device is Connected after the IP Phone 110 Login.

In embodiments where the computing device is connected (or equivalently powered on, application started etc) after the IP phone 110 has been logged into, it may be desirable to initiate device association and deferred login to the computing device, based on prior valid login to the IP phone 110. In these embodiments, the following modifications to the above methods could be used. Note that it is not actually necessary for the IP phone 110 to be logged in for the device association to take place (i.e. steps 207-210 may not be needed below, or may be deferred, and the device association will still take place):

At steps 201-202: LLDP-MED from the computing device, and subsequent detection of neighbours, as well as sending of Neighbor_info to the call controller 155, is deferred until the computing device connects.

At step 203: triggered by the Neighbor-info, the call controller 155 sends "Associate" message to the association database 150 as before, to in turn trigger/establish the device association.

At step 206: the call controller 155 can send a deferred Login_event to the application server 160, as in described above. Alternatively, the Login_event could be sent earlier such as at time of user login to the IP Phone 110, and the Login_event stored at the application server 160, or in an appropriate database, with steps 207-210 triggered by the application server 160 based on detecting that a new association between the devices is made in the association database 150 as a result of above Associate message at step 203. In the latter alternative implementation, there are a number of methods for said detection of new association, including but not limited to polling of the association database 150 by the application server 160 or spontaneous notification of the application server 160 by the association database 150.

At steps 207-210: proceed as in embodiments where the user logs in to the IP phone 110 first.

Variation 4—Computing Device Application Started after IP Phone Login:

As a further variation on the same method, if the computing and/or communication device is connected (or equivalently powered on), however no application requiring device association is running at first, the link layer protocol may not yet have started on one or more device involved. Some link layer protocols (e.g. LLDP) can be started from the application layer; hence the application may directly or indirectly start the device association process, when necessary. This may be before or after the IP phone 110 (or the PC/laptop 115 or the thin client 120) has been logged into. This may be (as a non-limiting example) for the application to be able to use the IP phone 110 as part of its communication process, or as an adjunct for some other purpose (streaming music, text to speech, etc). A deferred login may also be initiated as previously described, if needed for the application. The following modified methods are possible in these cases.

Variation 4a—Computing Device Contacts (or Comprises) The Association Database 150.

At application startup, the computing device (i.e. the PC/laptop 115 or the thin client 120) may contact the call controller 155 to obtain access to the association database 150, to request that it be informed of any Neighbor_info notifications, or may begin polling the association database 150 to the same purpose (possibly filter to be only those containing its device ID or IP address as part of the info). The application then starts the link layer protocol at the computing device. In these embodiments, the following variations may apply:

At steps 201-203. Proceed as in the previous variation (Variation 3), however in some embodiments, the link layer protocol may be started at the computing device (i.e. the PC/laptop 115 or the thin client 120) by the application.

At steps 204-210. If the application is making use of deferred login, steps 204-210 proceed as in the previous variation (Variation 3). Otherwise, or in addition, messaging similar to steps 207-208 can be used by the application to query the association database 150 to obtain the IP phone MAC (or other unique ID pair), as previously stored in step 203 described above, as well as the mapping of computing device user ID to the equivalent IP phone user ID (such as the user's personal DN ("UserDN")). The application then uses these IDs to interact with the call controller 155 (or IP phone 110 directly) to control the device.

Variation 4b—Computing Device Uses Link Layer Protocol Directly.

Alternatively, the computing device may initiate the link layer protocol as above, and directly use the IP phone MAC and/or IP address (or other unique identifiers) obtained from a link layer message sent from the IP phone 110 towards the computing device. Initiation may be as a result of startup or connection of the computing device, or start of the application. This embodiment assumes the IP phone 110 is also transmitting the link layer protocol from its end of the link towards the attached computing device (either PC/laptop 115 or thin client 120) (this messaging not shown in the FIG. 2). The application can then use these obtained IDs to interact with the call controller (or phone directly) to control the device, initiate a login, or for other purposes.

In embodiments of Variation 4b, the computing device may be the PC/laptop 115 that watches the link layer protocol directly, while in other embodiments the PC/laptop 115 may further comprise the application server 160 and/or the association database 150, and hence messages transmitted between these elements occur internally to the PC/laptop 115. In further embodiments of Variation 4b, the computing device may comprise the thin client 120 that watches the link layer protocol directly and communicate obtained IDs and/or other information to the related thin client server 125, while in other embodiments the thin client server 125 may further comprise the application server 160 and/or the association database 150, and hence messages transmitted between these elements occur internally to the thin client server 125.

While embodiments described use MAC addresses as device identifiers throughout, other types of device identifiers are within the scope of present embodiments, as long as the device identifiers used are unique to the particular physical communication/computing device, and invariant. In some embodiments, each communication/computing device may use a different device identifier type. Further discussion of this appears below.

Furthermore, while embodiments described assume that user IDs exist corresponding to the same user in both the computing device subsystem (thin client 110/thin client server 125, or PC/laptop 115) and in the communication subsystem (call controller 155/IP phone 110), and that these user IDs can be collated to each other, the specific format of the user IDs is not important, as long as they are unique to the particular user, and invariant. The user IDs may be the same in each subsystem, or different. There are many ways to accomplish the collation of user IDs in each subsystem, including but not limited to:

The user IDs use the same approach, for example a simple, unique user name string, uniform user_id/password pair, SIP URI, in which case there is no collation needed.

Both user ID types may pre-exist in a separate database (e.g. in a corporate LDAP server), one keyed from the other or both from a common key, for example using user name as a key to extract the corresponding computing subsystem user_id/password as well as the communication subsystem Directory Number (DN) for that user.

There may be an algorithmic relationship, for example transforming a user name string to SIP URI and/or a computer system user_id, or form one to the other directly.

The collation between user IDs may be configured into the association database 150.

At steps 203, 207, and 208: association of devices IDs and user IDs may be stored separately in the association database 150 rather than as one record as shown. Also, there may be different databases and/or servers used for each association type. In these embodiments, step 203 remains the same (associating device IDs), while steps 207-208 would comprise separate query/response pairs for each of device ID association data and user ID association data. This makes no difference to the end result, other than increased messaging and different distribution of the data storage.

In many instances, physical location data may be available to the devices involved, for example by use of GPS or other positioning measurement technology, through link layer or higher layer protocol interactions (e.g. through Link Layer Discovery Protocol-Media Endpoint Discovery (LLDP-MED), DHCP, or HELD protocols), or through direct configuration. This information may take the form of civic address (city/street address/floor/room number), coordinate-based geographic location (latitude/longitude/altitude), or other locally relevant indices such as wiremap wall jack number, or similar. Where this information is available, it can also be added to the association database 150 information associated with a set of devices at the same physical location, using messaging such as the Neighbor_info message as described here. Where such information can be obtained for at least one associated device, it can then be used by applications as an index to determine and access some set of devices at a particular location, determine that some set of devices are (or are not) at the same location, or determine the set of all associated devices at a particular location.

Supplementary data supplied in the link layer protocol (e.g. LLDP-MED Inventory data), or configured directly into the communication devices, may be used either directly as part of the device association process (e.g. using unique device ID contained in that supplementary data, such as device DN or Asset Number), or may be used to modify the association process (e.g. only allow association of devices of particular make/model, or at particular software versions, known asset numbers, etc). This is not shown in the messaging described above with reference to FIG. 2, however is a straight-forward extension by passing this supplementary data in the Neighbor_info, Associate, Association_Query/Association_Query_response or other messaging.

Other variations on the messaging described may include, but are not limited to:

The IP phone 110 may interact directly with the association database 150 rather than via the call controller 155 to establish the device association (steps 202-203);

The IP phone 110 may interact directly with the application server 160 rather than via the call controller 155 to establish the device association (steps 202-203) and/or to initiate user login (steps 209-210);

Notification messages (e.g. steps 202, 205, and 206) may be implemented by a Subscribe/Notify pattern rather than as a one-way spontaneous event (for example as SIP Subscribe/Notify messages).

As in the general system description previously described, since each entity described is logical only, the functions may be arbitrarily combined. For example, the application server 160 and/or the association database 150 functions may be integrated in the thin client server 125, the call controller 155 may (in effect) be integrated in the IP phone 110 (e.g. a SIP phone device), etc.

Link Layer Discovery Via Computing Device

Embodiments where link layer discovery occurs via a communication/computing device (i.e. the PC/laptop 115 or the thin client 120) are now described. In these embodiments, it is assumed that the IP phone 110 is connected to the network via an embedded or attached L2 switch/bridge, similar to the L2 switch/bridge 145, in the desktop communication/computing device (i.e. the switch/bridge is integrated with PC/laptop 155 or thin client 120). This scenario is basically the inverse of the previously described embodiments, with the difference that the connectivity of the IP phone 110 is via the desktop communication/computing device, rather than visa-versa. (Note that the connectivity of this configuration is not specifically depicted in FIG. 1, but is a straight-forward extension.)

Figure 2:
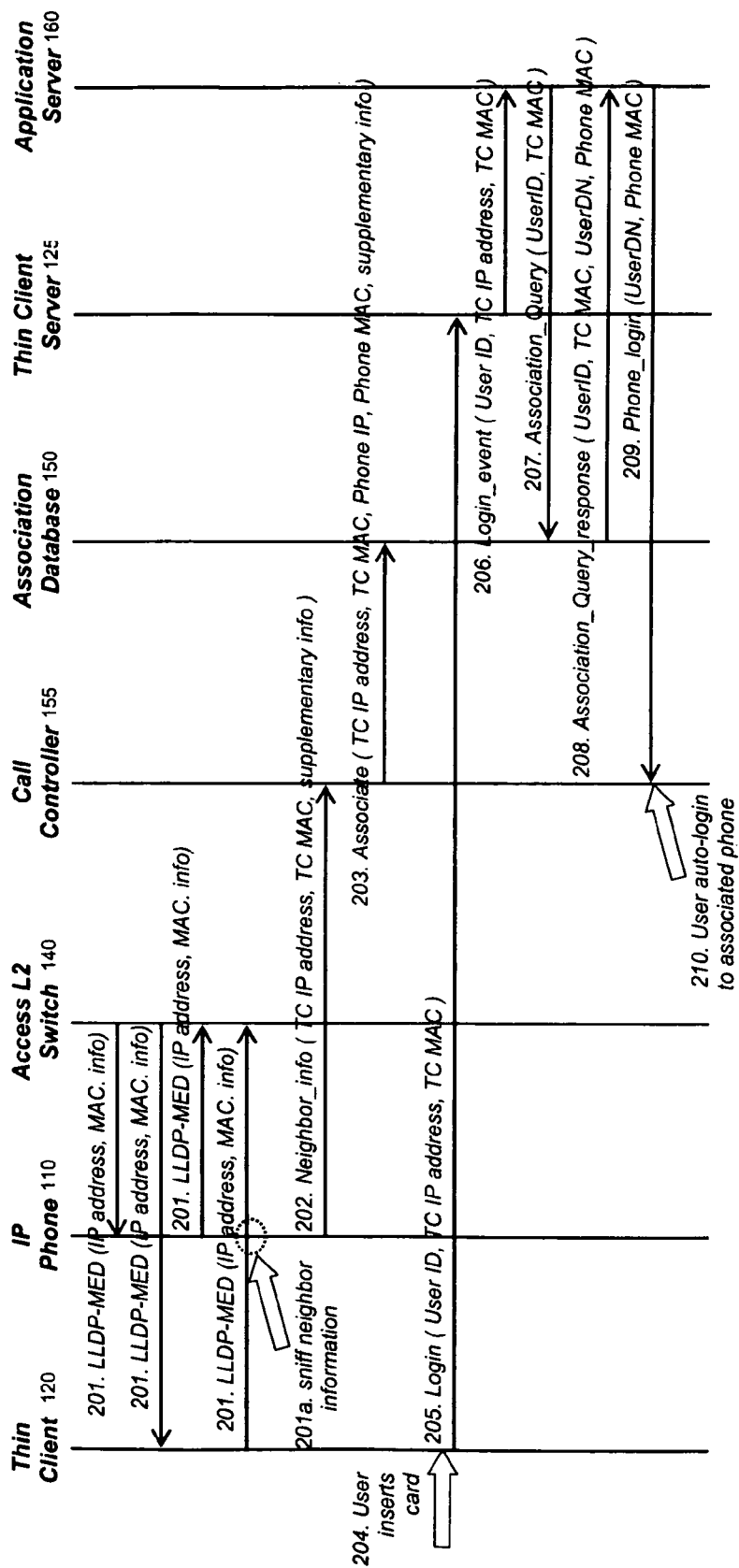
FIG. 2 depicts a message diagram for associating networked communication devices, according to a non-limiting embodiment.

In this method, the steps of Link Layer Discovery via the IP phone 110 are largely unchanged with reference to FIG. 2, with the following exceptions:

At step 201, LLDP-MED is passed to the network via L2 switch/bridge in (or associated with) the desktop communication/computing device.

At step 201a. LLDP-MED is "sniffed" at the desktop communication/computing device.

At step 202. The communication/computing device's neighbour information, regarding the attached IP phone 110, may be passed to a server other than the call controller 155 (e.g. directly to the application server 160). In the case of the thin client 120, the thin client server 125 would pass the information. In the case of the PC/laptop 115, the PC/laptop 115 would pass the information directly. In other embodiments, the interaction may still occur with the call controller 155 as previously described, for example in embodiments where the computing device can access facilities in the call controller for this purpose.

At step 203, collation of the association may be carried out in a server other than the call controller 155 such as in the application server 160, resulting in the Associate message being sent from that server to the association database 150, establishing the device association.

At step 204, in the IP Phone login case, the identification card 135 is inserted into the IP phone 110. Alternatively, in the computing device login case, the identification card 135 is inserted into the thin client 120 or PC/laptop 115. However, other login methods may occur as described previously.

At step 205, in the IP phone login case, this may result in a user Login message or equivalent being sent to the call controller 155, and as a result, the user is logged into the IP phone 110 and may begin using it. Alternatively, in the computing device login case, this may result in a Login message or equivalent sent from the thin client 120 to the thin client server 125, or actions internal to the PC/laptop 115, resulting in the user being logged in to the computing device.

At step 206, in the IP Phone login case, as a result of the login, a Login_event message or similar may be sent from the call controller 155 to the application server 160. Alternatively, in the computing device login case, as a result of the login, a Login_event message or similar may be sent from the thin client server 125 (in thin client embodiments) or directly from the PC/laptop 115 (in PC/laptop embodiments) to an application server 160.

At step 207, in the IP Phone login case, the auto-login application running on the application server 160 may then query the association database 150, passing in the IP phone MAC (or other unique device ID) and the logged in user's communication subsystem User ID as keys. Alternatively, in the computing device login case, the computing device MAC (or other unique device ID) and logged in user's computing subsystem User ID may be passed as keys.

At step 208, the association database 150 returns the mapping of the IP phone MAC to the computing device MAC (or other unique ID pair) as well as the mapping of IP phone user ID to the equivalent computing device user ID.

At step 209, in the IP Phone login case, the auto-login application on application server 160 may then send a control message to the thin client server 125 (in thin client embodiments) or to the PC/laptop 115 (in PC/laptop embodiments), requesting that the user be logged into the associated computing device, passing the computing device MAC address (or other unique device ID) and the user's User ID as known to the computing subsystem (e.g. the network user name/password). Alternatively, in the computing device login case, a control message may be sent to the call controller 155, requesting that the user be logged into the associated IP Phone, passing the IP Phone MAC address (or other unique device ID) and the user's User ID as known to the communication subsystem (e.g. the user's DN).

At step 210, in the IP Phone login case, the user is auto-logged into the associated computing device, and may begin using it. Alternatively, in the computing device login case, the user is auto-logged into the associated IP Phone, and may begin using it.

Link Layer Discovery Via Network Notification

Turning now to embodiments where link layer discovery occurs via network notification, it is assumed that the communication/computing device (the PC/laptop 115 or the thin client 120) may or may not connected to the network via the IP phone's 110 embedded L2 switch/bridge 145, or visa-versa. When not connected to the network via an embedded L2 switch/bridge, then the communication/computing devices each connect to different ports on the network access L2 switch 140 (Desktop B and D scenarios of FIG. 1). When connected on different access ports, it is assumed that there is some method available to know that the connections to these ports actually terminate at the same physical location (e.g. at the same wall jack, in the same conference room, etc), for example using a wiremap data or location data accessible by the network access L2 switch 140. For example, in some of these embodiments the wiremap data may be stored at the network access L2 switch 140, while in other embodiments, the wiremap data may be stored at the wiremap database 170, and the wiremap data is retrieved by the network access L2 switch 140 via a query through the data network 130. These embodiments are now described with reference to FIG. 3 which depicts a message diagram for associating networked communication devices, according to a non-limiting embodiment. Further reference is made to FIG. 1 using the Desktop A scenario, in which the thin client 120 is connected to the network access L2 switch 140 via the IP phone embedded L2 switch/bridge 145. Embodiments for Desktop B, C and D, scenarios using different connectivity and/or PC/laptop 115, are also described below.

In this method, the device association may proceed as follows (referring to the message diagram of FIG. 3):

Step 301. Similar to step 201 described above.

Step 302. Triggered by connection of the communication/computing devices to the network, and subsequent detection of LLDP-MED information on the links by the network access L2 switch 140 (or equivalently connection of the computing device to the IP phone embedded L2 switch/bridge 145 which simply passes the messages along), network link change of state events ("Notify_link_change") messages are generated from the network access L2 switch 140 to the application server 160, carrying the network access L2 switch 145 port ID and the connected device's IP addresses and MAC addresses. Similar messaging occurs for each connected communication device, carrying that communication device's individual IP address and MAC address, and the same network access L2 switch port ID. Any supplementary data carried by LLDP-MED messaging in the previous step may also be carried in the notification events.

Step 303. Since the Notify_link_change messages are from the same port ID (or equivalently, the notification arrives as a single message for all attached devices on that single port ID) the application server 160 is now able to collate the IP phone data with the computing device data, and sends an association message ("Associate") or equivalent to the association database 150, containing a mapping of computing device MAC address to IP phone MAC address (or other unique identifiers) and also the IP address of the computing device as well as that of the IP phone 110. Any supplementary data gathered from the previous step may also be carried. This association is stored in the association database 150 for later use by applications. Hence, the application server 160 effectively triggers the association between the devices by sending the association message. The device association phase is complete.

Step 304-310 are substantially similar to steps 204-210 described above.

Figure 3:
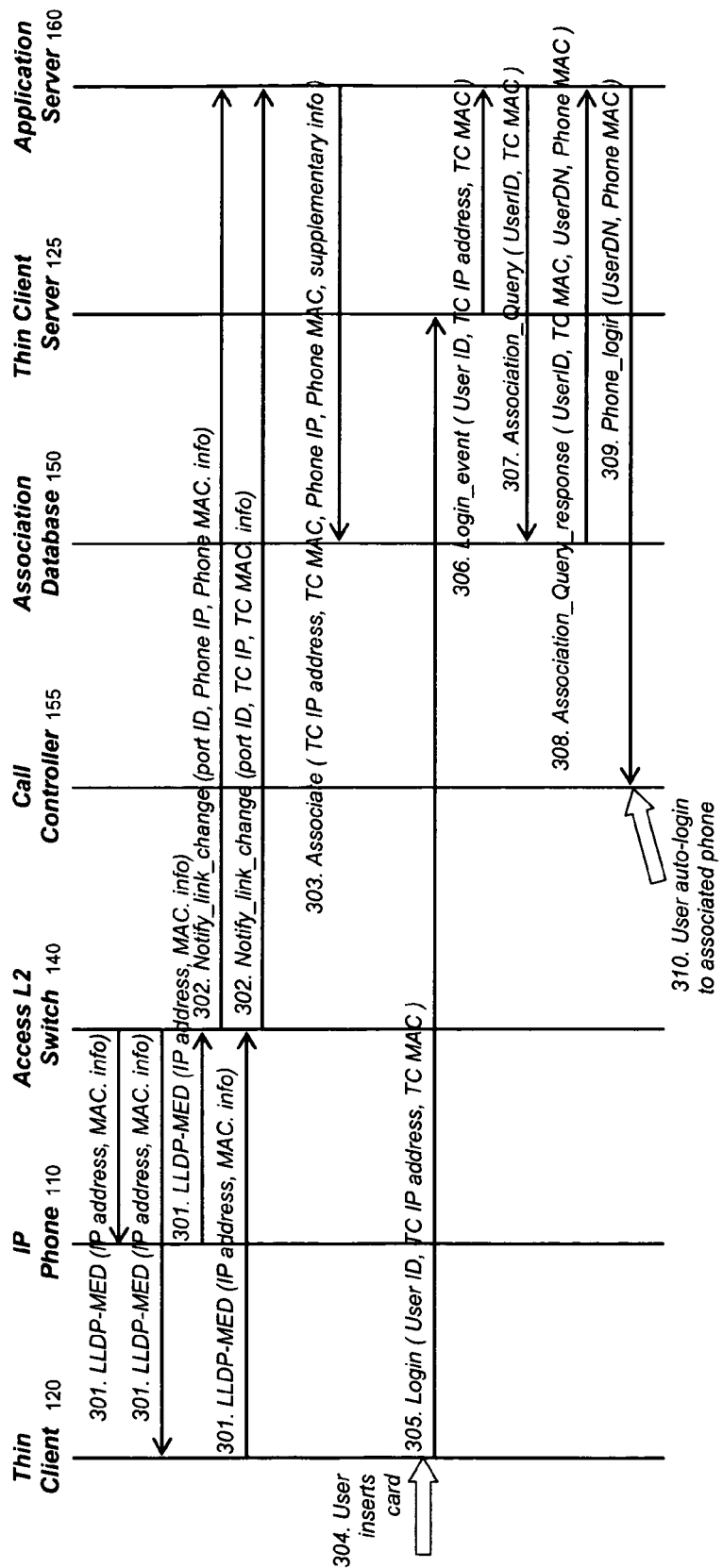
FIG. 3 depicts a message diagram for associating networked communication devices, according to a non-limiting embodiment.

Other variations on the messaging described with reference to FIG. 3 may include, but are not limited to:

Step 302 may use multiple messages (one per attached device, as shown), or a single message (notifying regarding all devices attached);

The notification protocol used in step 302 may be SNMP (as defined in LLDP-MED), or another suitable protocol.

Step 302 may be implemented in multiple steps e.g. by a more primitive notification from the network access L2 switch to the application server 160, for example simple port LinkUp/LinkDown notifications (e.g.) using SNMP Bridge MIB (Management Information Base) or similar, which the application server 160 then uses to trigger one or more queries for more specific data on the notified port(s). The more specific queries may, for example, use LLDP-MED defined SNMP MIBs or other similar query formats.

Variations for Devices Connected on Different Ports

In further variations on above methods, the computing device (thin client 120 or PC/laptop 115) and IP phone 110 may be connected to different network access L2 switch ports (i.e. not connected via an embedded L2 switch/bridge on either, as shown in FIG. 1 Desktop B or D). In this case, then the collation of step 303 above can use any of several methods to collate the information. For example:

Step 303a. The application server 160 may contain or have access to the wiremap database 170, which contains mappings of access switch port ID to physical location data related to the termination of the port (e.g. to room number, wall jack identifier, etc). The collation can then be based on matching termination location. Note that in many applications it is adequate to be able to determine that the port. IDs correspond to the same physical location, not necessarily what that specific location is. Also, where non specific indices are used (such as a wall jack identifier), and the identifiers are not the same, it may be possible to determine that these identifiers do in fact map to the same physical location by performing further queries to the wiremap database 170, for example by querying the mapping of each wall jack identifier to a physical location for each, then matching returned physical location information. Once such collations are made, then the Associate message from the application server 160 to the association database 150 may be formed and sent.

Step 303b. The network access L2 switch 140 may be configured to contain physical location information associated with each port (e.g. as defined by LLDP-MED), for example giving geographic location coordinates, civic address coordinates, room number, wall jack identifier, etc. This location information may then be queried by the application server 160 upon receipt of the notifications (e.g. using SNMP as enabled by LLDP-MED), or equivalently supplied directly as part of the notification(s). The collation can then be based on matching network access L2 switch location data.

Other variations on these embodiments, similar to embodiments described above with reference to FIG. 2 are within the scope of the present specification. These include, but are not limited to:

Any network element, such as the call controller 155, the thin client server 125 or the PC/laptop 115, may act as (or comprise) the application server 160 and/or the association database 150.

Any or all of the messages shown as being spontaneous events (e.g. messages 301, 302,) may be implemented as a Subscribe/Notify interaction.

Supplementary information such as User ID, may also be carried directly in the link layer protocol messaging (messages 301), as well as in link change notification (message 302) and in Associate messages (303), thus updating the association database 150 with associated user data valid at the time of device association.

Link Layer Discovery Via Network Query

Embodiments where link layer discovery occurs via a network query are now described. In some of these embodiments, the communication/computing device (e.g. the PC/laptop 115 or the thin client 120) is connected to the network via the IP phone's 110 embedded L2 switch/bridge 145 (or visa-versa), as in Desktop Scenarios A and C in FIG. 1. In other embodiments, each device is connected to different ports on the network access L2 switch 140, as in Desktop Scenarios B and D. When connected on different access ports, it is assumed that there is a method available to know that the connections to these ports actually terminate at the same physical location (e.g. at the same wall jack), for example using a wiremap data or location data accessible by the network access L2 switch 140. For example, in some of these embodiments the wiremap data may be stored at the network access L2 switch 140, while in other embodiments, the wiremap data is stored at the wiremap database 170, and the wiremap data is retrieved by the network access L2 switch 140 via a query through the data network 130. These embodiments are now described with reference to FIG. 4 which depicts a message diagram for associating networked communication devices, according to a non-limiting embodiment. Further reference is made to FIG. 1 using the Desktop A scenario, in which the thin client 120 is connected to the network access L2 switch 140 via the IP phone embedded L2 switch/bridge 145. Embodiments for Desktop B, C and D, scenarios using different connectivity and/or PC/laptop 115, are also described below.

In this method, device association may proceed as follows (referring to the message diagram of FIG. 4):

Step 401. Similar to Step 201, described above.

Figure 4:
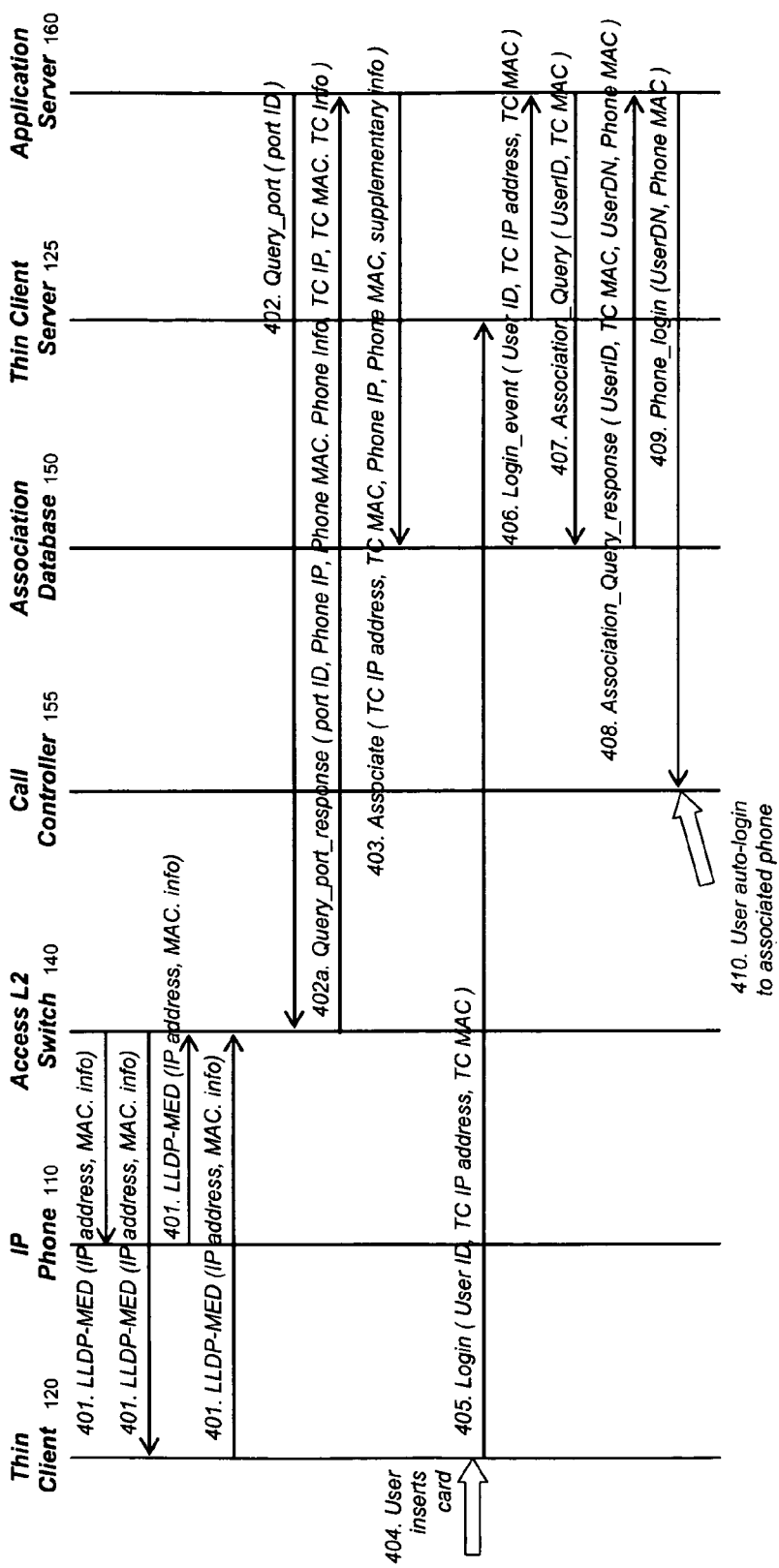
FIG. 4 depicts a message diagram for associating networked communication devices, according to a non-limiting embodiment.

Step 402. The application server 160 periodically polls the network access L2 switch 140 ("Query_port") on an ongoing basis to detect changes in connected devices at the network access L2 ports. It is noted that while only one poll is depicted in FIG. 4 for the sake of clarity, there would in general be a plurality of Query_port polls, occurring periodically, or as triggered by the application server 160. Alternatively, in embodiments where all devices are understood to be non-mobile, a single query as shown may suffice.

Step 402a. The network access L2 switch 140 responds ("Query_port_response") carrying the network access L2 switch port ID and the connected device's IP addresses and MAC addresses for each port. In cases where more than one device is attached to the port, then the returned response may contain data related to each device, or multiple response messages may be used.

Step 403. Since the Query_port_response messages are from the same Port ID (or alternatively, the responses arrives as a single message for all attached devices on the port) the application server 160 is now able to collate the communication/computing device's data with the IP phone's data, and sends an association message or equivalent to the association database 150, containing a mapping of computing device MAC address to IP phone MAC address (or other unique identifiers) and also the IP address of the computing device as well as that of the IP phone. This association is stored in the association database 150 for later use by applications. Hence, the application server 160 effectively triggers the association between the devices by sending the association message. The device association phase is complete.

Steps 404-410 are substantially similar to steps 204-210 described above.

Variations on the messaging described with reference to FIG. 4 may include, but are not limited to:

To gather information on each device attached to a particular port on a network access L2 switch 140, steps 402-402a may use multiple message pairs (one query/response per device on the port), or a single message pair (providing bulk information on all attached devices on that port);

To gather information on each port on a network access L2 switch 140, steps 402-402a may use multiple message pairs (one query/response per port, or as above one query/response per device per each port), or a single message pair (providing bulk information on all device on all attached ports);

The query/response protocol in steps 402-402a may be SNMP (e.g. as defined in LLDP-MED), or any other suitable protocol.

Rather than polling, Step 402-402a may also be triggered, for example by a more primitive notification from the network access L2 switch 140 to the application server 160, for example simple port LinkUp/LinkDown notifications (e.g.) using SNMP Bridge MIB, or similar, which the application server 160 may then use to trigger one or more queries for more specific data on the notified port(s). The more specific queries may (e.g.) use LLDP-MED defined SNMP MIBs, and the like.

The start of the querying which occurs at Step 402 from the application server 160 to network access L2 switch 140 may be triggered by messaging from the call controller 155 (alternatively directly from the IP phone 110), or from the computing device (either the laptop/PC 115 the thin client server 125) to the application server 160. Any number of methods may be used for this messaging, for example an SNMP notification event, the specific method being immaterial here. The triggering message may possibly (but not necessarily) also supply the specific switch port ID to be queried. To improve polling efficiency, this triggering message may be sent at an appropriate time such as follows:

the IP phone 110 and/or computing device (115, 125) may notify an application server 160 to begin polling at initial network connection time;

the call controller 155 (or the IP phone 110 directly) may notify an application server 160 to begin polling upon successful registration of an IP phone 110 to the call controller 155;

the call controller 155 (or the IP phone 110 or the PC/laptop 115 or the thin client 120, or the thin client server 125) may begin polling upon successful login of a user to an IP phone 110 (or to the PC/laptop 115 or the thin client 120)).

Variations for Devices Connected on Different Ports

In further variations on the above described methods, the computing device (the thin client 120 or the PC/laptop 115) and IP phone 110 may be connected to different network access L2 switch ports (i.e. not connected via the embedded L2 switch/bridge 145 on either, as shown in FIG. 1 Desktop Scenarios B or D). The variations on methods based on Link Layer Discovery via Network Query as described immediately above are similar to those previously described under the heading Variations for Devices Connected on Different Ports under the description of methods based on Link Layer Discovery via Network Notification, as previously described.

Other variations on these embodiments, similar to embodiments described above with reference to FIGS. 2 and 3 are within the scope of the present specification.

Device and User Disassociation

Attention is now directed to embodiments where the previously established associations are undone. For example, at least one associated device may no longer be in communication with the data network 130 due to it being powering off or disconnected. In another example, a user may log-off from one or more of the devices and the previously established associations with other devices is no longer valid. Processes of disassociation may hence resolve privacy issues and other security concerns, resource consumption and/or abuse issues.

The following embodiments to achieve disassociation of devices are described with reference to those previously described. Indeed, each embodiments described below for disassociation corresponds to an above described association method.

Device Disassociation Using Link Layer Discovery Via a Device

Embodiments where device disassociation occurs using link Layer discovery via the IP phone 110 are now described, with extensions to equivalent methods using discovery via the computing device (e.g. the PC/laptop 115 or the thin client 120). These embodiments are in essence the reverse of those described above with reference to FIG. 2, for the corresponding device association. While the following is described with reference to FIG. 2, it is understood that a method of disassociation is described using similar messaging to that depicted in FIG. 2. When an attached computing device (e.g. the PC/laptop 115 or the thin client 120 and/or the IP phone 110) is disconnected or powered off, or the relevant application is closed, there are two cases corresponding to messages 201-203 of FIG. 2.

Case A—Passive

Step 201. As a result of disconnection, power off, or application close, LLDP-MED (or equivalent) messaging ceases from the computing device towards the network access L2 switch 140, and hence the IP phone 110 and its embedded L2 switch/bridge 145 as well.

Step 201*a*. Hence, as a result of the messaging ceasing, the corresponding neighbour information in the IP phone 110 (sniffing the messaging) is aged out and becomes invalid.

Case B—Active

Step 201. At power off or application close, an explicit link layer message from computing device towards the network access L2 switch 140 may be sent indicating the device is no longer in use.

Step 201*a*. The explicit link layer message indicating the device is no longer in use is sniffed by the IP phone 110. In these embodiments, the IP phone 110 is enabled to invalidate the corresponding neighbour information.

Hence the disassociation of the devices may be detected either via Cases A or B. After this, the following may occur:

Step 202. When the upstream device information is invalidated by either Case A or Case B, a new Neighbor_info message is sent to the call controller 155, indicating that the upstream device is no longer active.

Step 203. As a result, a new Associate message is sent from the call controller 155 to the association database 150, the new Associate message enabled to trigger the removing or invalidating the corresponding device association at the association database 150 (in essence a disassociation message).

Device disassociation may also occur in embodiments using link layer discovery via the desktop computing device. These embodiments of disassociation are similar to those described above, with the exception that the LLDP-MED messaging (or equivalent) is ceased from the IP phone 110 towards the network and computing device (Step 201 Case A), or an explicit message sent (Step 201 Case B), and the Neighbor_info message indicating change of device connectivity is sent to the application server 160 from the computing device (i.e. from the PC/laptop 115, from the thin client 120, or from the thin client server 125), rather than from the call controller 155 or the IP phone 110 (Step 202). The Associate message indicating removal of the association would then be sent from the application server 160 to the association database 150 (Step 203).

Device Disassociation Using Link Layer Discovery Via Network Notification

Embodiments where device disassociation occurs using link layer discovery via network notification are now described. These embodiments are in essence the reverse of those described above with reference to FIG. 3, for the corresponding device association. While the following is described with reference to FIG. 3, it is understood that a method of disassociation is described using similar messaging to that depicted in FIG. 3. When an attached device (e.g. the PC/laptop 115, the thin client 120 and/or the IP phone 110) is disconnected or powered off, or the relevant application is closed, there are two cases corresponding to messages 301-303 of FIG. 3.

Case A—Passive

Step 301. As a result of disconnection, power off, or application close, LLDP-MED (or equivalent) messaging ceases from the computing device (or alternatively from the IP phone 110) towards the network access L2 switch 140. As a result of lack of advertisements from the computing device or the IP phone 110, the corresponding information contained at the network access L2 switch 140 is aged out and invalidated.

Case B—Active

Step 301. At power off or application close, an explicit link layer message may be sent from the computing device (or alternatively from the IP phone 110) to the network access L2 switch 140 indicating the device is no longer in use. This message triggers an invalidation of the corresponding upstream device information at the network access L2 switch 140.

Hence the disassociation of the devices may be detected either via Cases A or B. After this, the following may occur:

Step 302. When the device information at the network access L2 switch 140 is invalidated, as a result of the change, a new Notify_link_change message may be sent to the application server 160, indicating that the upstream device is no longer active.

Step 303. As a result, a new Associate message is sent from the application server 160 to the association database 150, the new Associate message enabled to trigger the removing or invalidating the corresponding device association at the association database 150 (in essence a disassociation message).

Device Disassociation Using Link Layer Discovery Via Network Query

Embodiments where device disassociation occurs using link layer discovery via network query are now described. These embodiments are in essence the reverse of those described above with reference to FIG. 4, for the corresponding device association. While the following is described with reference to FIG. 4, it is understood that a method of disassociation is described using similar messaging to that depicted in FIG. 4. When an attached device (e.g. the PC/laptop 115, the thin client 120 and/or the IP phone 110) is disconnected or powered off, or the relevant application is closed, there are two cases corresponding to messages 401-403 of FIG. 4.

Case A—Passive

Step 401. As a result of disconnection, power off, or application close, LLDP-MED (or equivalent) messaging ceases from the computing device (or equivalently from the IP phone 110) towards the network access L2 switch 140. As a result of lack of advertisements from the computing device or the IP phone 110, the corresponding information contained at the network access L2 switch 140 is aged out and invalidated.

Case B—Active

Step 401. At power off or application close, an explicit link layer message is sent from the computing device (or equivalently from the IP phone 110) to the network access L2 switch 140 indicating the device is no longer in use. This message triggers an invalidation of the corresponding upstream device information at the network access L2 switch 140.

Hence the disassociation of the devices may be detected either via Cases A or B. After this, the following may occur:

Steps 402-402*a*. At the next polling interval, when Query_port is sent from the application server to the network access L2 switch, the returned Query_port_response indicates the invalidated device(s) is no longer active. In some embodiments, this may comprise an absence of information for that device, while in other embodiments, this may comprise explicit indication that the device is now inactive.

Step 403. As a result, a new Associate message is sent from the application server 160 to the association database 150, the new associate message enabled to trigger the removing or invalidating the corresponding device association at the association database 150 (in essence a disassociation message).

User Level Disassociation

In some of the above described embodiments of device association, once the device-level disassociation is accomplished, the user is also dissociated, for example to automatically logoff the user from some or all of the formerly-associated devices. In some of these embodiments, a corresponding user-level action on all associated devices occurs as a result of user action taken at one of those devices, for example to logout from some or all as a result of logout from any. Hence, in a hotdesk environment, if a logout occurs at one device, a logout may occur at other devices in the hotdesk association.

Two embodiments of disassociating the user are now described, Case A and Case B, however other embodiments are within the scope of the present specification. While the following is described with reference to FIG. 2, it is understood that embodiments of disassociating the user use similar messaging to that depicted in FIG. 2.

Case A—Device Disassociation Driven

If the disassociation is physical (device disconnected, powered off or application closed, as in previously described scenarios) then device disassociation is detected at the application server 160 (see previous sections on disassociation methods, and specifically steps 203, 303 and 403).

Triggered by the physical device disassociation, in the case of computing device disconnection, the application server 160 can then send a logout message (not depicted) to the call controller 155, logging the corresponding user out from the corresponding IP phone. Referring to steps 204-210 in FIG. 2 (and, similarly, Steps 304-310 in FIG. 3 and Steps 304-310 in FIG. 4), this process can proceed by the following steps:

Steps 207-208. The application server 160 retrieves the association data corresponding to the user of the newly disconnected device, using the computing device-relevant user ID as a key. The corresponding user ID as used in the call controller 155 (UserDN) is extracted from the response.

In some embodiments, however, the device ID may also be needed for logout. In these embodiments, the association database 150 may temporarily maintain an association between devices until user logout occurs. For example, the association data base 150 may maintain a record of the devices being disassociated even though the same user is still logged into the devices.

Step 209. A Phone_logout message (equivalent to Phone_login in the message diagrams) is sent from the application server 160 to the call controller 155, containing the extracted user ID (UserDN). (Note that in some embodiments, the phone MAC may not be needed in this message, since the call controller 155 already knows which physical IP phone the user is logged into.)

Step 210. The user is then logged out from the IP phone 110 by call controller 155.

Further variations on Case A are as follows:

Alternatively, if the initial disconnect/power off/application close was initiated from the IP phone 110, then the user association query may be regarding the computing device user ID, and the corresponding logout message may be sent from the application server 160 to the thin client server 125 (or directly to the PC/Laptop 115), causing the computing device to logout the user at that device instead.

The physical device association data may be completely removed from the association database 150, or may be marked as inactive and remain cached in the association database for later use when the removed device is reconnected. If a new connection or power-on is detected at a later time, then the device association must again be re-established as previously described, but may make use of any previously cached data to assist this process.

At step 303 (or 403, or 503) as described previously for device disassociation, prior to sending the Associate message to remove the device association from the association database 150, the application server 160 may pre-query the existing association data from the association database 150 following steps similar to steps 307/308, and retain that data for later us in user-level disassociation process as above.

Equivalently to the above variation, at step 303 (or 403, or 503), the Association message may have a corresponding response message back from the association database 150 to the application server 160, indicating the device association data removed, including all formerly associated device IDs or other data needed to perform the user-level disassociation process as above.

Case B—User Action Driven

If the user logs off at one of the associated devices (but not disconnected or powered off) or takes some other action to terminate the user-level session at that device (e.g. the application is closed), then the equivalent user logoff or other action may need to be taken at the other associated devices. In this case, the physical association may remain in the association database for later use, since the devices themselves are still in the same relationship.

Triggered by a user action on one device, in the case of computing device logout, the application server 160 can then send a logout message to the call controller, logging the corresponding user out from the corresponding IP phone. Referring to steps 204-210 in FIG. 2 (and, similarly, Steps 304-310 in FIG. 3 and Steps 304-310 in FIG. 4), this process can proceed by the following steps:

Step 204. User removes their identification card 135 from the thin client 120, or logs off in some other way. In the PC/laptop case, the card may be removed or other logoff action taken at a PC/laptop 115.

Step 205. As a result the thin client 120 may then send a logout message or equivalent to the thin client server 125. This may be similar to the Login message sent at this step during device association and auto-login previously described.

Step 206. The thin client server 125 may then send an event message indicating the user logout to the application server 160. In the PC/laptop case, a similar message may be sent directly from the PC/laptop 115 to the application server 160. This may be similar to the Login_event message sent at this step during device association and auto-login previously described.

Steps 207-208. The application server 160 retrieves the association data corresponding to the user of the newly logged out device, using the computing device-relevant user ID as a key. The corresponding user ID as used in the call controller 155 (e.g. User DN) is extracted from the response.

Step 209. A Phone_logout message (equivalent to Phone_login in the message diagrams) is sent from the application server 160 to the call controller 155, containing the extracted user ID (e.g. User DN). (Note that the phone MAC may or may not be needed in this message, since the call controller 155 already knows which physical phone the user is logged into.)

Step 210. The user is logged out from the IP phone 110 by call controller 155.

Further variations on Case B are as follows:

Alternatively, if the initial log off was initiated from the IP phone 110, then the logout event will be via the call controller 155 (or directly from the IP phone 110) to the application server 160, the user association query will be regarding the computing device user ID, and the corresponding logout message is sent from the application server 160 to the thin client server 120 (or to the PC/Laptop 115), causing the computing device to logout the user at that device instead.

The physical device association data may remain in the association database 150 for later use when a new (possibly same) user again logs into one of the associated devices. In some embodiments, the physical association may only be destroyed or marked inactive only if there is a physical disconnect or power-off detected. If a new connection or power-on is detected at a later time, then the device association must again be re-established as previously described.

Further variations applicable to both Case A and Case B are as follows:

Both cases above are equally applicable to PC/laptop scenarios, in which case the corresponding messages would be sent and received by the PC/laptop 115 directly, rather than by the thin client server 125. Messages previously described as between thin client 120 and thin client server 125 would instead be internal to the PC/laptop 115.

Alternative Embodiments

There are a further alternatives to the previous embodiments described with reference to FIGS. 1 through 4, including, not limited to:

Embodiments are not limited to LLDP-MED being used as the link layer protocol, and any other could be used where sufficient information is provided for the association. Non-limiting examples of such protocols include Spanning Tree Protocol (STP) or proprietary protocols such as Cisco Discovery Protocol (CDP).

While non-limiting examples have described on thin client scenarios, all methods described are equally applicable to PC/laptop scenarios. In these cases all corresponding messages would be sent and received by the PC/laptop 115 directly, rather than by the thin client server 125. Messages described as between thin client 120 and thin client server 125 would instead be internal to the PC/laptop 115.

While non-limiting examples have described the application of auto-login/logout across multiple devices, these are primarily described to demonstrate workability of the device association steps to facilitate such applications. A great many other applications are within the scope of the present specification, including but not limited to: association of a telephony keypad ("TKB") to a PC-based Attendant Console application; association of a PC adjunct telephony device (e.g. Mitel Navigator from Mitel Networks, 350 Legget Drive P.O. Box 13089, Kanata, Ontario, Canada K2K 2W7) to the attached PC running the control application. Indeed, no login/logout actions may be needed for many applications. For example, simply plugging in a device may automatically make it available even though no user login has occurred on any device.

While the above described embodiments comprises only two devices to be associated (or disassociated), an arbitrary number of devices may be associated, as long as connectivity between them is established through one of the devices (e.g. via a multi-port embedded L2 switch, similar to the L2 switch/bridge 145 in the Desktop A and Desktop C scenarios), or sufficient mapping or location data is available to associate multiple network access L2 switch ports with each other (similar to the network access L2 switch ports described in the Desktop B and Desktop D scenarios).

Aspects of the association methods described with reference to FIGS. 1 through 4 may be used concurrently in the association of multiple devices.

While described embodiments have referenced MAC address as a physical device identifier in related messaging, other identifiers are within the scope of the present specification. Indeed, any unique, invariant identifier of the physical device will suffice for the purpose. Non-limiting examples of identifiers include: UUIDs (Universally Unique Identifier), asset numbers, serial numbers, and physical device DN (directory number). As well, associated devices are not limited to using the same type of identifiers, and each device may use a different identifier type, as long as the identifiers remain unique to the specific.

While described embodiments have referenced wired network environments, wireless (e.g. WiFi, Bluetooth) networks can support equivalent methods, either using LLDP-MED or other equivalent protocols.

While described embodiments have referenced association of IP phones with desktop computing devices, the device associations may apply to any devices which are co-located in such a way that they should be associated to each other from the user or administrative perspective. Further examples include but are not limited to:

IP phone and adjunct units connected to the IP phone, or in close proximity, such as conference units, video cameras, busy lamp fields, etc.;

a plurality of computing and/or entertainment devices to be used in conjunction, such as PC/laptop, audio/video appliances, game controllers;

co-located computing devices, such as servers, cooperating in a common application, for example to implement multi-server clusters in a data center;

collaborative applications;

cluster computing/data centers; and any combination of the above.

As described above, device association via co-location detection is a form of proximity detection, as the association has determined that the devices are in the same location. As also described above, this enables the sharing of location information. In proximity-based applications, however, the characteristics and identity of the location are generally immaterial, but knowledge of proximity may be used to modulate applications associated with a communications device, even in the absence of specific location information, as will now be described.

Figure 5:
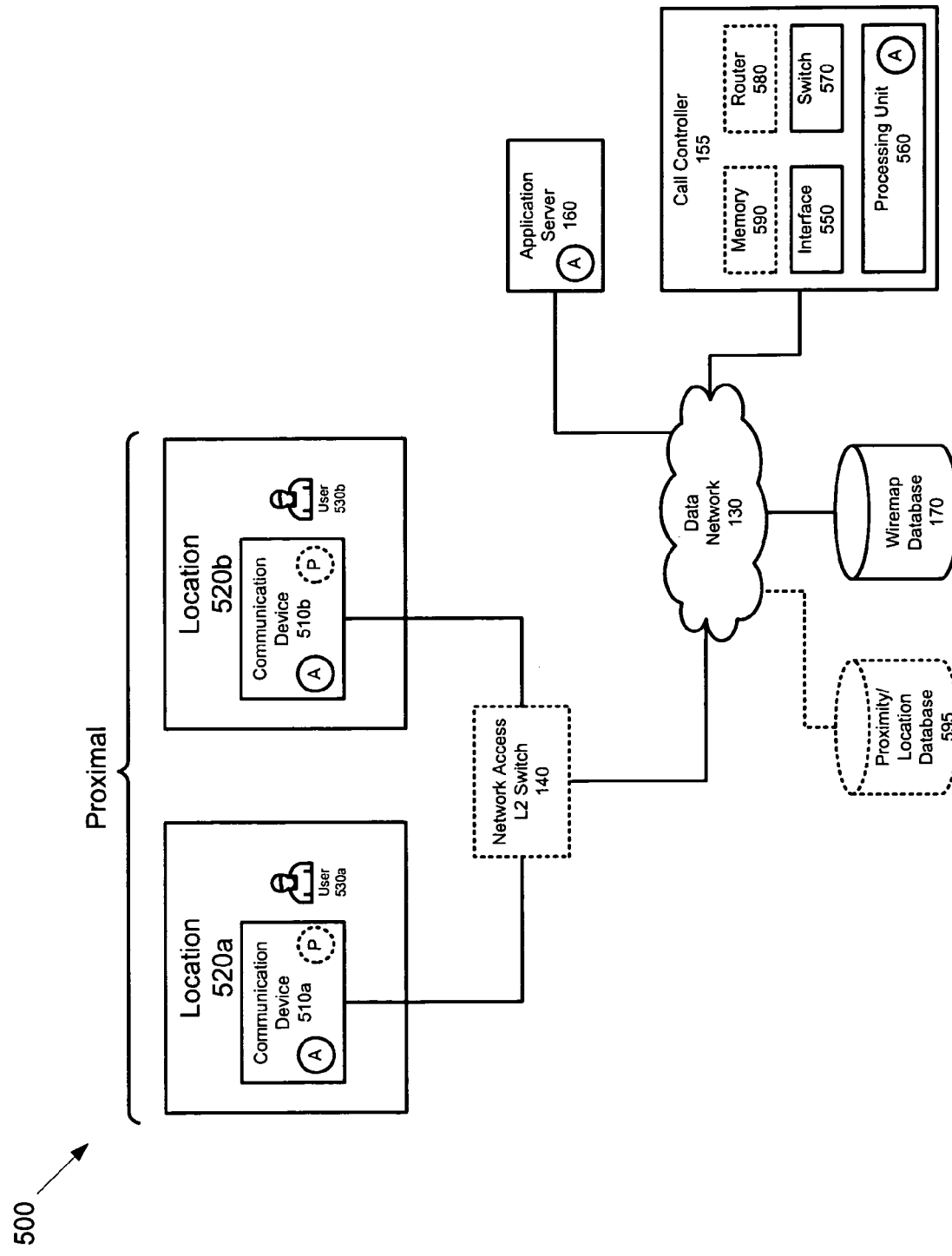
FIGS. 5 and 6 depict systems for modulating an application associated with at least one of a first communication device and a second communication device, according to non-limiting embodiments.

Attention is directed to FIG. 5, which depicts a system 500 for modulating an application associated with at least one of a first communication device 510a and a second communication device 510b (generically a communication device 510 and collectively communication devices 510), according to a non-limiting embodiment. In some embodiments, the system 100 and the system 500 have elements in common, with like elements depicted with like numbers. Further, in some embodiments, the first communication device 510a and/or the second communication device 510b may comprise the IP phone 110, the personal computer (PC) or laptop computer 115, and/or the "thin client" devices 120 described above, while in other embodiments, the first communication device 510a and/or the second communication device 510b may comprise a mobile electronic device such as a cell phone and/or a PDA enabled to communicate via any suitable wireless protocol and via any suitable wireless communication network.

Figure 6:
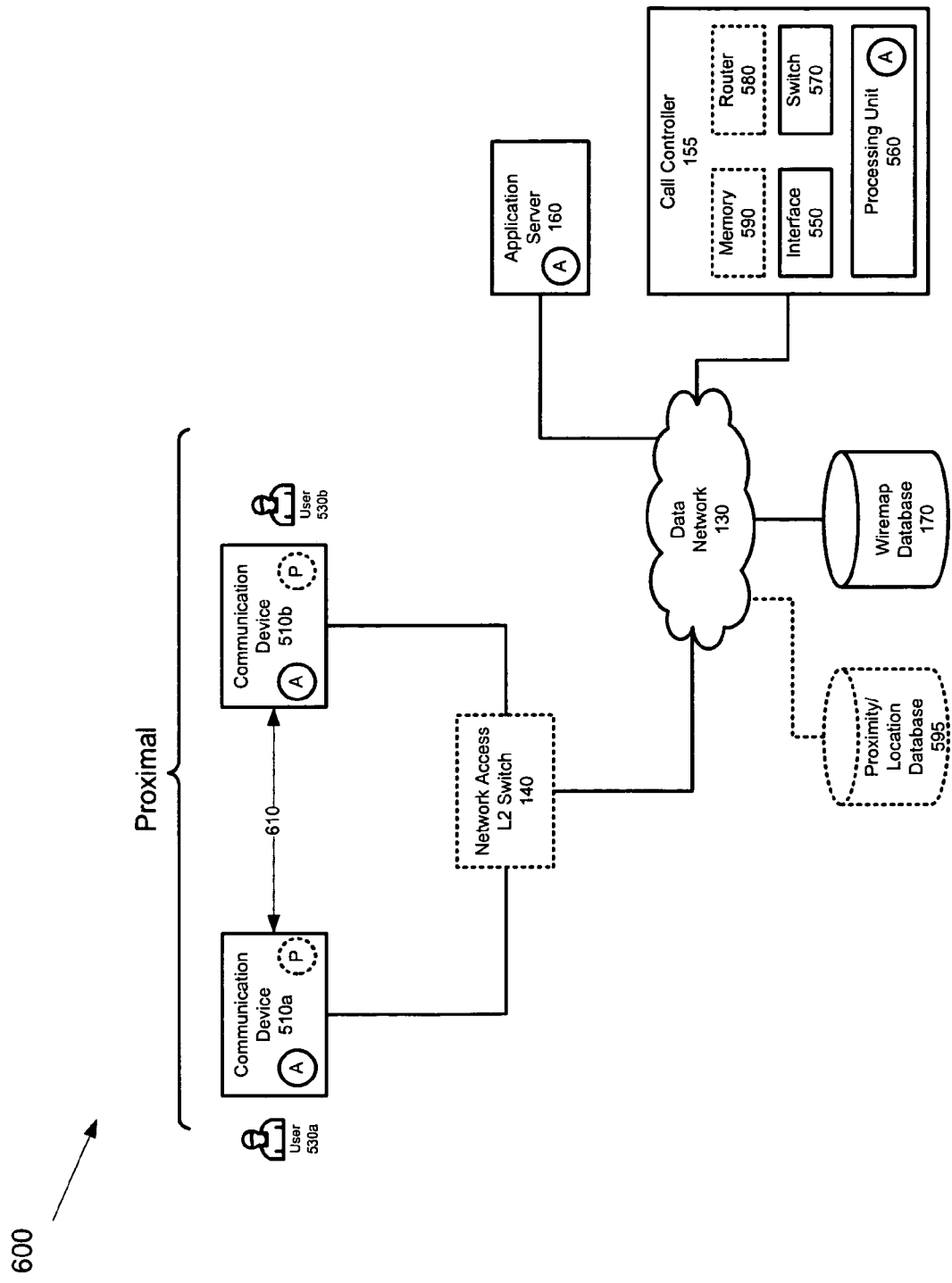

Further, applications associated with the first communication device 510a and/or the second communication device 510b, such as an application A, may reside at the first communication device 510a and/or the second communication device 510b and/or the application server 160 and/or the call controller 155. In some embodiments, the application A comprises an application associated with establishing a communication session between the first communication device 510a and the second communication device 510b via a communications network remote from the first communication device 510a and the second communication device 510b, such as the data network 130, or any other suitable communications network. It is understood that a remote communications network is any communications network that comprises switching and/or routing elements that are separate and/or remote from the communications devices 510. Further, a remote communications network is distinct from a personal area network (PAN) that exists between the communications devices 510, for example a PAN based on a PAN protocol such as Bluetooth™ (for example, see FIG. 6 described below).

In some embodiments, the application A comprises a collaboration application A, which enables the communication devices 510 to collaborate. In some of these embodiments, the application A enables the communication devices 510 to collaborate via a remote communications network, as described above.

Further, in system 500, the call controller 155 may comprise a communications interface 550 enabled to communicate with the communication devices via the data network 130 (or any other suitable communication network), a processing unit 560 for processing the application A, and a switch 570 for connecting calls between the communication devices 510. In some embodiments, for example in embodiments where the communication session is a packet based communication session, the call controller 155 may further comprise a router 580 for routing packets between the communication devices 510. In some of these embodiments, switch 570 may not be present in the call controller 155. In some embodiments, the call controller 155 comprises a PBX. Further, it is generally understood that communication sessions that are established between the communication devices 510 via the call controller 155, are established via a remote communications network. In some embodiments, the call controller 155 further comprises a memory 590 for storing a copy of the application A, and/or switching/routing data that assists in establishing a communication session between the communication devices 510.

In any event, the first communication device 510a is located at a first location 520a, and associated with a user 530a, and the second communication device 510b is located at a second location 520b (generically a location 520 and collectively locations 520), and associated with a user 530b (generically a user 530 and collectively users 530).

In some embodiments, one or more of the communications devices 510 are connected to the data network 130 via the network access L2 switch 140 (e.g. as in FIG. 1), and the locations of the one or more communication devices are stored in the wiremap database 170 compiled via link layer data, as described above. Hence, in these embodiments, the location of a communication device 510 may be determined based on the link layer data, for example by consulting the wiremap database 170.

However, in other embodiments, the location of a communication device 510 may be determined based on GPS (Global Positioning System) data, if a communication device 510 comprises a GPS module, as known to one of skill in the art. Hence, the location of a communications device 510 may be determined by querying the GPS module, for example via the data network 130 or another communications network.

In some of these embodiments, the communications device 510 comprises a wireless electronics device (i.e. wirelessly connected to the data network 130 or another suitable communications network enabled for wireless communication, and not connected to the data network 130 via the network access L2 switch 140).

Further, in other embodiments where a communications device 510 is a wireless mobile electronic device, the location of a communications device 510 may be determined by its network access via a given wireless access point (e.g. a WiFi Access Point, a cell phone access point, and the like (not depicted)), and/or via RF triangulation data collected from a plurality of wireless access points (not depicted) in communication with the communications device 510, as known to a person of skill in the art.

In yet further embodiments, the location of a communications device 510 may be determined based on user data: for example, a user 530, upon changing location, may enter user data which identifies a current location into a communication device 510 (e.g. via an input device such as a keyboard, a pointing device etc.), In some embodiments, location data may be stored at the communications device 510, while in other embodiments location data may be transmitted to a remote database (e.g. the association database 150 and/or a proximity/location database 595) and/or the call controller 155 (e.g. and stored in the memory 590). Hence, the location of the communications device 510 may be determined by requesting location data from the communications device 510 and/or the remote database (e.g. the association database 150 and/or the proximity/location database 595) and/or the call controller 155, and/or a combination. However, where the location data is stored is not particularly limiting.

Furthermore, the format of the location data is not particularly limiting and may be any suitable format including, but not limited to, geolocation (latitude/longitude/altitude), building/room identifier, civic addressing, and/or wiremap identifier, etc. In addition, it is understood that the format of the location data may be different for different communication devices 510, and further that that the location data from different communication devices 510 may be correlated independent of the format of the location data for a particular communication device 510.

In yet other embodiments, personal area network (PAN) technologies can be used to determine if the communications devices 510 are proximal, without determining the location(s) of the communication devices 510. For example, attention is directed to FIG. 6 which depicts a system 600 for modulating an application associated with at least one of the first communication device 510a and the second communication device 510b, according to a non-limiting embodiment. System 600 is substantially similar to FIG. 5, with like elements having like numbers. However, in system 600 the absolute locations of the communication devices 510 are not necessarily known and/or determinable. Further, the communications devices 510 have established a PAN communications session 610 between them based on a PAN protocol. In some embodiments, the PAN protocol comprises the Bluetooth™ protocol, however other PAN protocols and technologies will occur to a person of skill in the art and are within the scope of present embodiments. As also known to a person of skill in the art, PAN protocols are generally enabled to function over a limited distance, and hence if a BlueTooth™ enabled communication device 510 is in communication with another BlueTooth™ communication device 510, determination that the communication devices 510 are proximal may occur by virtue of the communication session 610 being established. It is further understood that in these embodiments, proximal is understood to be co-located. The proximity of the communication devices 510 may then be reported to a central device, such as the call controller 155 or the remote database (e.g. the association database 150 and/or a proximity/location database 595), either automatically or upon receiving a request from the central device.

In some embodiments, proximity-based applications may be modulated based on whether the communication devices are proximal or non-proximal, with each condition triggering a different modulation mode. Furthermore, in some embodiments, proximity may be understood to be co-located, while in other embodiments, proximity may be further constrained by a determination that the communication devices 510 are in the same room, building, public area or other constrained space, i.e. the devices may be physically nearby, however the communication devices 510 may not be determined to be proximal and/or co-located unless they are in the same physical space.

For example mobile devices may be only a short physical distance from each other, however located in different rooms, and could thus be considered "nearby", but not 0strictly co-located. Proximity applications may be modulated accordingly. Hence, in these embodiments, proximity applications may comprise at least one proximity mode based on the communication devices 510 being "nearby" but not strictly co-located. In some embodiments, such conditional proximity may be determined by processing the location data associated with the communication devices 510. In some of these embodiments, such conditional proximity may be determined by processing further data describing the physical space in which the communication devices 510 are located. Such processing may, include, but is not limited to: correlating wiremap data containing the room identifiers with geolocation data (e.g. geolocation data indicates that the communication devices 510 are separated by only a short distance, but wiremap data indicates that the communication devices 510 are located in different rooms); mapping of geolocation data associated with the communication devices 510 to shape data describing the geometric shape of the physical space in which the communication devices 510 are located; and/or mapping of location data to civic location data, and comparison of the civic location data each communication device 510. Other methods for determining a level of proximity (e.g. co-location, proximal, "nearby" and to what degree, and non-proximal) are within the scope of present embodiments.

Furthermore, in some embodiments, definitions of co-location and/or proximal and/or nearby and/or non-proximal may be set by a user 530 and/or an administrator of the system 500 and/or the system 600. Such an administrator may define the modulation of a proximity-based application associated with a given proximity mode, including but not limited to the proximity conditions which trigger the given proximity mode. For example, proximity based applications may be modulated according to communication devices being located in a given room and/or the same room, a given floor and/or the same floor of a building, and/or within any suitable given physical domain. In some of these embodiments, the communication devices 510 may be defined as co-located, while in other embodiments, the communication devices 510 may be defined as proximal, as determined by the administrator, and modulated accordingly.

However, it is understood that some proximity-based applications comprise only a proximal mode and a non-proximal mode, with the conditions for proximity and/or non-proximity defined by the administrator. In some of these embodiments, proximal is understood to be co-located, but co-location is not necessarily a condition for proximity.

Furthermore, in some embodiments, determination that the communication devices 510 are in the same given physical domain (e.g. a given physical space) may be insufficient for determination of proximity; in these embodiments, physical distance may be the condition which determines co-location and/or degree of proximity. For example, in some embodiments, it may be determined that two communication devices 510 are in the same given physical domain, but the given physical domain may be a hockey arena. In such embodiments, the communication devices 510 may be further separated by a distance that precludes a positive determination of proximity and/or co-location (e.g. at opposite ends of the hockey arena and/or different sections of the hockey arena). Hence, in these embodiments, a positive determination of proximity and/or co-location may occur if the communication devices 510 are separated by less than a threshold distance.

In some embodiments, the communication devices 510 may be enabled to support collaboration applications, such as the application A, associated with features that may be based on the assumption that the users 530 are distant from each other. However, certain aspects of these features may be unsuited to instances in which the users 530 are proximal to each other. As described above, in some embodiments, proximal is understood to be co-located, while in other embodiments, proximal is understood to be nearby. For example, knowledge of proximity of communication devices 510 that are processing collaboration applications, such as application A, may be used to modulate collaboration application activity and/or behaviour appropriate to the proximity. In some embodiments, options may be offered to users 530 which are appropriate to the proximity. In some embodiments, modulation of applications may occur via a proximity client P resident at the communication devices 510, the proximity client enabled to interface with collaboration applications as appropriate. Alternatively, proximity based modulation features may be built into the collaboration applications themselves.

In some embodiments, modulating an application comprises selecting between one of a plurality of modes of the application, each of the plurality of modes associated with a different level of proximity between the communication devices 510. Such levels of proximity may be based on the distance between the communication devices 510, as described above, and further described below. As indicated previously, level of proximity, or co-location, may be further conditioned by determination that the devices are in the same physical domain/space. For example, in some embodiments, there may be one mode for when the communication devices 510 are proximal and a second mode for when the communication devices 510 are not proximal. In other embodiments, there may be one mode for when the communication devices 510 are co-located, a second mode for when the communication devices 510 are nearby, and a third mode for when the communication devices 510 are not proximal. Some of these embodiments may comprise a plurality of nearby modes, each of the plurality of nearby modes based on different distances between the communication devices 510.

In a non-limiting example, if the communications device 510a is attempting to establish a communications session with the communications device 510b (e.g. via the data network 130, or any other suitable communication network), an application associated with establishing the communication session may be modulated to refrain from offering the option of voice or video sessions to the users 530 if the users 530 are proximal to each other, wherein proximal is understood to mean co-located. Co-located may be defined as the communication devices 510 being separated by less than a given threshold distance and/or the communication devices 510 being located within the same physical domain/space. The assumption is made in this scenario that the user 530a wishes to share data with the proximate user 530b and does not need to be bothered with un-useful options rendered unnecessary by the proximity of the users 530. In some embodiments, the default modulation behaviour can be set by one or more of the users 530.

In another non-limiting example, if the communications device 510a is attempting to establish a communications session with the communications device 510b in circumstances where the communication devices 510 are not co-located, the communications device 510b may be caused to play an aural alert (i.e. the phone rings, a remote desktop application indicator plays etc.), and/or display a given visual indicator, to indicate the attempt at opening the communications session. However, if the communications devices 510 are co-located/proximal such aural alerts may be distracting and/or unwanted. Hence, such aural alerts may be modulated if the communications devices 510 are determined to be co-located/proximal. Such modulation may thus range from playing a quieter alert, to disabling the alert altogether, to presenting a different visual indicator. In other embodiments, such modulation may be further based on a level of proximity: for example, the sound level of an aural alert may be varied and/or a visual distance indicator may be presented, (or any other suitable indications (vibration etc.)) based on the distance between the communication devices 510, and/or a determination that they are in the same physical domain/space.

In yet further embodiments, that proximity has been determined may further indicate the users 530 inherent desire to establish the communication session. Hence, the communication session can be accepted/established at the communications device 510b without further input from the user 530b (e.g. a communications application is modulated to be in an "auto-answer" mode). In some embodiments, an alert may be played once the communications session is established (e.g. "You have established a communication session with the user 530b").

In a further non-limiting example, the local displaying (and/or playing) of confidential information at one or more of the communication device 510 may be suppressed by the proximity modulation client, P, resident on the communication devices 510, if it is known that the communication devices of unauthorized users are present. In this embodiment, the proximity client P may consult a database of authorized and/or unauthorized communication devices/users to determine whether or not to allow the display of confidential information (such a database can be local to a communication device 510 or remote and accessible via the data network 130). In some embodiments, the explicit permission of a user 530 could be requested prior to displaying confidential information.

In embodiments where associations are made between communications devices, (e.g. as described above with reference to system 100), the elements of the system 100 and/or the system 500 (and/or the system 600), or combination of elements. which monitors and/or triggers the association (e.g. the call controller 155 and/or the application server 160) can be further enabled for proximity based modulation of an application associated with at least one of the communication devices 510. For example, the appropriate element may trigger the modulation of an application available at a communication device 510, based on data associated with a co-located/proximal communication device 510 once the communication devices 510 are determined to be co-located/proximal. For example, once the communication devices 510 are determined to be co-located/proximal, the appropriate element may determine permissions associated with the first communication device 510a (e.g. based on permissions stored at a database etc.) and make certain applications available at the second co-located/proximal communication device 510b based on these permissions. In another example, data, such as personal information management (PIM) data stored in association with the first communication device

510*a* could be made available to the second co-located/proximal communication device 510*b*.

In some embodiments, the functionality of proximity based modulation of an application associated with at least one of the communication devices 510 may be implemented within a network element, such as a router, or any other suitable network infrastructure component.

However, in other embodiments, modulating an application associated with at least one of the communication devices 510 may occur for communication devices which are proximal, wherein proximal is understood to be nearby but not necessarily co-located, or associated. For example, once the locations of each of the communication devices 510 are determined, the distance between them may be determined. This distance may be compared to a threshold distance. If the distance is less than (or equal to) the threshold distance, then the communication devices 510 may be determined to be proximal to each other, and modulating an application associated with at least one of the communication devices 510 may be triggered in response.

In some embodiments, the threshold distance may further take into account whether the communication devices 510 are on the same floor of a building. If so, a larger threshold distance may be acceptable, as it will take the same travel time for a user 530 to walk a longer distance within a given floor, then if the user 530 has to take the stairs or an elevator.

In some embodiments, the approximate travel time from the location 520*a* to the location 520*b* may be calculated (e.g. an application which calculates the travel time being pre-provisioned with walking speed of the user 530, time to travel between floors etc.), and the approximate travel time being compared to a threshold travel time.

Yet further embodiments may comprise a plurality of threshold distances, each threshold distance associated with a different level of proximity, such that the application A can be modulated passed the different proximity levels (i.e. different levels of "nearby").

Alternatively, absolute locations may not be known, but proximity may nonetheless be determined if the relative position of locations are known. For example, relative position of locations may be stored in a database, and the proximity may between communication devices 510 at locations 520 may be determined by querying the database. In a specific non-limiting example, if the location 520*a* of the communication device 510*a* is determined to be "Office 201" and the location 520*b* of the communication device 510*b* is determined to be "Office 202", and relative position between the "Office 201" and the "Office 202" is stored in a database as "proximal" or "adjacent", then the communication devices 510 are determined to be proximal. In some of these embodiments, as described above, proximal is understood to mean nearby, but not directly co-located (e.g. in the same room).

In yet further embodiments, the proximity between communication devices 510 may be known via any of the methods described above, however a communication device 510 may not inherently be associated with a user 530. However, if a user 530 subsequently logs into a communication device 510, the user 530 may then be associated with the communication device 510 logged into, and the proximity between users 530 determined based on the log-in.

Some applications/features that may be modulated based on proximity, are more desirable when the communication devices 510 being nearby, but not co-located (e.g. in the next office). For example, in one embodiment an application may be provided where the user 530*a* would be notified when the user 530*b* is nearby. The user 530*b* may be specified by the user 530*a* via the application A and/or the proximity client P, or any other suitable application. For example, the user 530*a* may be notified when the user 530*b* is visiting someone in an adjacent office, and hence the user 530*a* may walk a short distance to meet the user 530*b*.

However, in some circumstances (e.g. in a suite of offices associated with a business), the user 530*b* may often be in the office adjacent to the user 530*a*, and the user 530*a* may hence find it annoying to be receiving a notification every time this occurs. Thus, in some embodiments, an application may be modulated such that the user 530*a* is notified of the proximity of the user 530*b* only when the user 530*a* is attempting to establish a communication session the user 530*b* (i.e. via the communication devices 510). For example, the user 530*a* may attempt to initiate a communication session with the user 530*b*, using the communication device 510*a* (e.g. entering an identifier of the communication device 510*b*, such as a cell phone number), and a remote communications network (e.g. the data network 130 and/or the call controller 155). When such an attempt is made, the call controller 155 may initiate a proximity application, (e.g. the application A) which determines the proximity of the communication devices 510, as described above, and notifies the user 530*a* of the proximity of the user 530*b*. The user 530*a* may be notified by transmitting an indication of at least one of the location 520*a* and the location 520*b* to the communication device 510*a*, such that a representation of the indication is output at the communication device 510*a*, for example via a message displayed at an output device (e.g. "You are calling Joe. If you like, you can talk to him directly as he is in the next office"). This may be referred to as "nearby feature". In some embodiments, the representation may comprise a map to the location 520*b*. In other embodiments, the attempted communication session is terminated. In further embodiments, the user 530*a* may be provided with an option to terminate the attempted communication session.

The use of the wiremap database 170 to associate communication devices 510 to the locations where they are present has been described above, as has how the wiremap database 170 can be used to associate devices within the location at which they are co-located. Thus the room in which a communication device 510 is present can be located. For the purposes of the "nearby feature", the identification of a room can be extended to determining if locations are nearby/proximal. This can either be done by giving each room an absolute location and thus being able to determine the distance between them at run time of the nearby feature, (with a criterion for "nearby" that indicates what distance and other factors such as floor are suitable), or it can be done offline and a table/database provided which links each room, or other location, with the identities of other rooms or other locations which can be considered nearby/proximal, as described above.

Thus, if the user 530*b* logs in on a computer or is determined to be in a room that is nearby the user 530*a* who has set a "nearby feature" application, the "nearby feature" application can be modulated to an "on state" (and conversely, modulated to an "off state", is the level of proximity changes to not proximal).

A further non-limiting example of modulating an application based on proximity is modulating a call back application. The user 530*a* may have attempted to establish a communication session with the user 530*b* via the communication devices 510. If the user 530*b* was unavailable (i.e. the communication device 510*b* was already engaged in a communication session and was not interruptible), the user 530*a* may have been given the option of receiving an automatic call back once the user 530*b* becomes free. Such call back application are known to persons of skill in the art, and in system 500 or system 600 may be initiated by the call controller 155 alerting the communication device 510*a* that the communication device 510*b* was available, and subsequently attempting to establish a communication session between them. However, such a call back would be redundant if the communication device 510*b* became proximal to the communication device 510*a* (e.g. the user 530*b* may have been travelling towards the location 520*b* while speaking on a cell phone (i.e. the communication device 510*b*). Hence if proximity between the communication devices 510 is determined, the call back application may be modulated to cancel the call back. In some embodiments, the call back application may be modulated only if the communication devices 510 are determined to be co-located and/or proximal. In yet further embodiments, the call back application may be modulated to a "nearby" mode (see above) if the communication devices 510 are determined to be proximal, but not co-located. For example, the call back application may be modulated to display a message that informs the user 530*a* that the user 530*b* is nearby and, in some embodiments, further informs the user 530*a* of the location of the user 530*b*. Hence the user 530*a* may prefer to go and see the user 530*b*, rather than have the call back initiated.

However, it should not be assumed that a communication device 510 is permanently associated with a single user; although that may be the case. For example, the communication device 510 may be a shared device, and users 530 may log into the shared device via any suitable method (e.g. username/password/identity card 135 etc.) In other embodiments, each communication device 510 may be specifically associated with a plurality of users 530 (e.g. any of the plurality of users 530 may be using the communication device 510 at a given time). In any event, the determination of proximity provides information that can be used to modulate applications, and further modulation may occur based on the user 530 or users 530. For example, sharing of location information among communication devices 510, as described above, is an application whose behaviour can be modulated by determination of proximity. In contrast, an application modulated by determination of proximity (specifically, in this instance, co-location) are notifications that are provided when the proximity of a specific user or users is determined. Other features such as the session initiation application described above can be triggered by a user but the behaviour can be modulated with knowledge that the called user is proximal (i.e. co-located) to the originating user.

Furthermore, in other embodiments, the co-location and/or proximity information that is encoded in the association database 150 may be further published to a presence server or a special purpose proximity server, where it will be available to trigger and/or modulate feature operation. In some embodiments, publish-subscribe model of such servers may be used for this purpose.

In some embodiments, the association database 150 may comprise a proximity database, such as the proximity/location database 595. Features which require information about communication devices 510 (and by implication their users 530) that are proximate or near-by another communication device 510 (and its user 530) can query the association database 150 and/or the proximity database to determine this information. This information may also be published to a presence server as proximity information for the user 530 and his/her communication device(s) 510.

Furthermore, while the described embodiments refer to operation of a single application, association information can also be used for context to determine the appropriate behaviour of a plurality of applications and/or a plurality of communication devices in the case of collaboration.

In addition, in some embodiments, devices may not be associated with any particular user, or may not associated with any user at all, e.g. the devices may be: computing equipment in a shelf, implementing cooperating applications or server clustering; a vending machine, a store location etc. of interest to the user; an automaton; a device implementing a user tracking application; and/or a device implementing an asset tracking application, etc.

Figure 7:
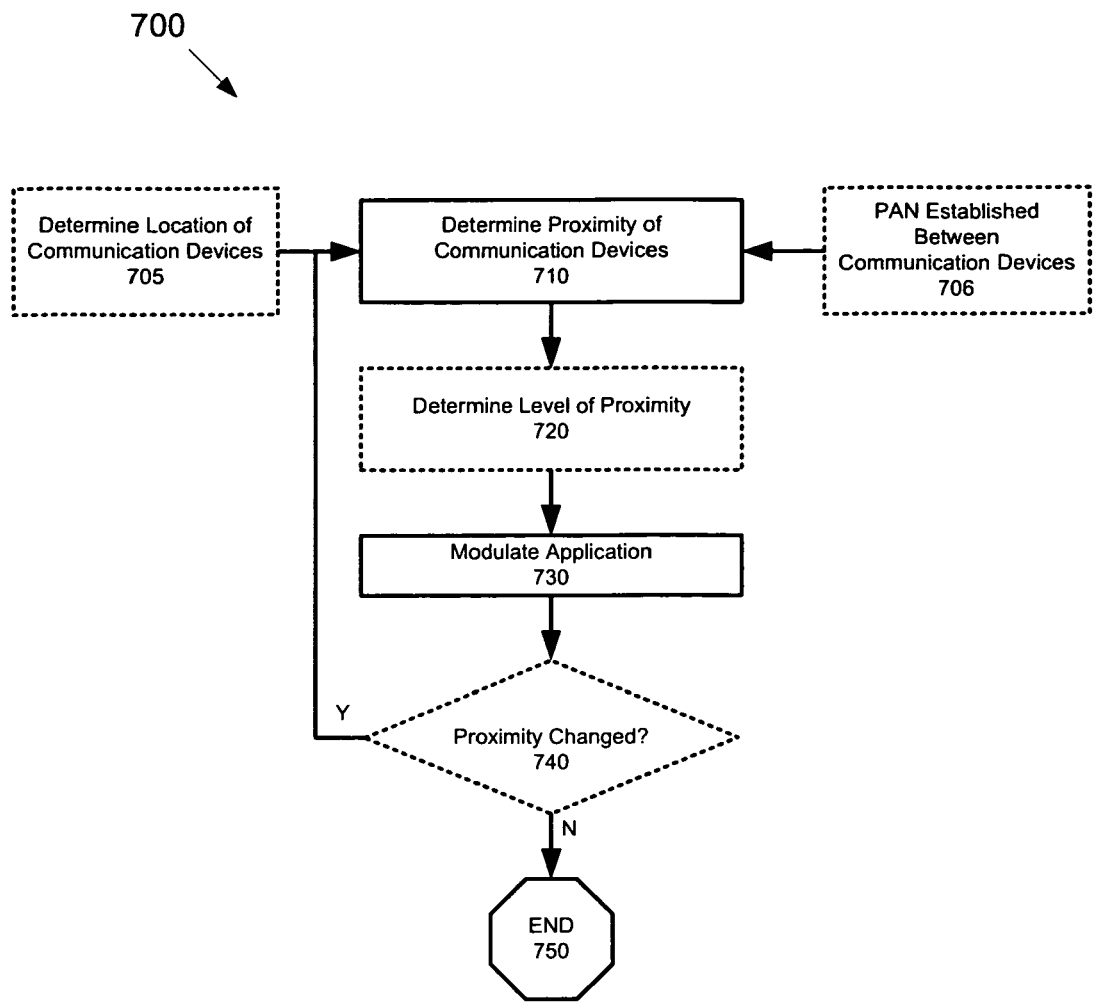
FIG. 7 depicts a method of modulating an application associated with at least one of a first communication device and a second communication device, according to a non-limiting embodiment.

Attention is now directed to FIG. 7, which depicts a method 700 for modulating an application associated with at least one of a first communication device and a second communication device. In order to assist in the explanation of the method 700, it will be assumed that the method 700 is performed using the system 500 (or alternatively, system 600). Furthermore, the following discussion of the method 700 will lead to a further understanding of the system 500 and its various components. However, it is to be understood that the system 500 and/or the method 700 can be varied, and need not work exactly as discussed herein in conjunction with each other, and that such variations are within the scope of present embodiments.

At step 710 the proximity between the communication devices 510 is determined. In some embodiments step 710 may be triggered when at least one of the communication devices 510 attempts to establish a communication session with at least one other communication device 510, for example via a remote communications network. In some embodiments, such a trigger may occur when a collaboration application is launched, and any attempt to establish a communication session may be preceded by a determination of proximity. In other embodiments, the determination of proximity may occur in parallel to attempting to establish a communication session. In yet further embodiments, determining proximity may occur after a communication session is established and when an application (and/or a feature in an application) is launched that may be modulated based on proximity. In further embodiments, proximity may be determined on an ongoing basis, for example by the proximity agent P independent of the activities of any application(s) which may be modulated based on proximity.

Furthermore, determination of the proximity between the communication devices 510 may occur local to one or more of the communication devices 510, or remote from the communication devices 510 (e.g. at the call controller 155 and/or the application server 180).

In some embodiments, step 710 may be preceded by step 705, determining the location of each of the communication devices 510 may be based on at least one of GPS data, wireless access point connection data, RF triangulation data, user data, wiremap data based on wired connection port and/or location data stored in a database. In some embodiments, the absolute location of each of the communication devices 510 may be determined, while in other embodiments a relative location of each of the communication devices 510 may be determined. In any event, in these embodiments, the proximity of the communication devices 510 is determined at step 710 based on the location of each of the communication devices 510 determined at step 705, for example by determining if the locations are in proximity to each other as described above.

In other embodiments, step 710 may be preceded by, or occur in parallel to, step 706, determining if a PAN communication session has been established between the communication devices 510, as described above. In embodiments, determining if a PAN communication session has been established comprises receiving a notification from at least one of the communication devices 510 that the PAN communication has been established, the notification received at a remote entity (e.g. the call controller 155) enabled to modulate an application associated with at least one of the communication devices 510. In other embodiments, determining if a PAN communication session has been established between the communication devices 510 comprises the remote entity querying at least one of the communication devices 510 as to whether a PAN communication session has been established and receiving the notification in return. In still other embodiments the availability of a PAN communication session (i.e. that a PAN could be established if desired) may trigger notification of proximity, or be used to affirm proximity when queried by a local or remote entity. Such notifications and/or querying may occur as part of step 710.

In some embodiments, at step 720, the level of proximity may be established, for example when an application to be modulated has different modes based on proximity and/or co-location, as described above. In some embodiments, step 720 may further comprise a determining a level of proximity based on co-location in the same physical space as previously described. For example, it may be determined at step 720 that the communication devices 510 are co-located in the same physical domain/space (room, public space, etc), as determined by processing of the location data determined at step 705. In some embodiments, such processing may further comprise correlation of location data and/or processing further data describing the physical space in which the communication devices 510 are located, such as wiremap data, shape data (e.g. shape of a physical space and/or a geographic domain), etc., as described above. Step 720 may occur in parallel to step 710, or after step 710.

At step 730 the application associated with at least one of the communication devices 510 is modulated based on proximity, as described above. Some applications that are modulated may be modulated once based on proximity, later changes in proximity being immaterial to the application (e.g. later changes in proximity are immaterial to a call back application where a pre-provisioned call back is disabled). However, in some embodiments, changes in proximity are monitored once the proximity is initially determined at step 710, and at step 740 it is determined if the proximity between the communication devices 510 has changed (e.g. the communication devices 510 have become closer together or farther apart). If so, the proximity may again be determined at step 710 (or alternatively as part of monitoring changes in proximity) such that the application can be modulated again at step 730. Otherwise the method 700 ends at step 750.

Those skilled in the art will appreciate that in some embodiments, the functionality of the PC/laptop 115, the IP Phone 110, the thin client 120, the thin client server 125, the network access L2 switch 140, the L2 switch 145, the association database 150, the call controller 155, the application server 160 and/or the communication devices 510 may be implemented using pre-programmed hardware or firmware elements (e.g., application specific integrated circuits (ASICs), electrically erasable programmable read-only memories (EEPROMs), etc.), or other related components. In other embodiments, the functionality of the PC/laptop 115, the IP Phone 110, the thin client 120, the thin client server 125, the network access L2 switch 140, the L2 switch 145, the association database 150, the call controller, the application server 160 and/or the communication devices 510 may be achieved using a computing apparatus that has access to a code memory (not shown) which stores computer-readable program code for operation of the computing apparatus, or any other suitable computer-readable storage medium. For example, the computer-readable program code may be stored on a medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method of modulating an application comprising one or more telecommunication features, the application intended for at least one of a first communication device and a second communication device, the method comprising:
   storing, in a database, an association between the first and the second communication devices;
   determining a proximity between the first communication device and the second communication device; and
   modulating, at least one of the features of the application prior to launching the application on the intended communication device, and modulating is based on a level of said proximity, wherein usability of the associated devices is not interrupted.

2. The method of claim 1, wherein said determining proximity between the first communication device and the second communication device comprises at least one of determining if the first communication device and the second communication device have established a personal area network communications session and determining if the first communication device and the second communication device are able to establish a personal area network communications session.

3. The method of claim 1, wherein said determining proximity between the first communication device and the second communication device comprises,
   determining a first location, said first location comprising a location of the first communication device;
   determining a second location, said second location comprising a location of the second communication device; and
   determining if said first location and said second location are in proximity to each other.

4. The method of claim 3, wherein said determining if said first location and said second location are in proximity to each other comprises:
   determining a distance between said first location and said second location; and
   comparing said distance to at least one threshold distance, said first location and said second location being in proximity if said distance is less than said at least one threshold distance or equal to said at least one threshold distance.

5. The method of claim 1, wherein the application comprises an application associated with establishing a communication session between the first communication device and the second communication device via a communications network remote from said first communication device and the second communication device.

6. The method of claim 1, wherein said determining proximity between the first communication device and the second communication device comprises determining a level of proximity between the first communication device and the second communication device.

7. The method of claim 1, wherein said modulating the application comprises at least one of:
enabling a first set of pre-defined features while the first communication device and the second communication device are proximal;
disabling a second set of pre-defined features while the first communication device and the second communication device are proximal;
removing a previously provisioned call back setting;
modulating an alert feature when establishing a communication session between the first communication device and the second communication device; and
automatically establishing a communication session between the first communication device and the second communication device when an attempt to establish said communication session occurs.

8. The method of claim 3, wherein said modulating the application comprises transmitting an indication of at least one of said first location and said second location to at least one of the first communication device and the second communication device, such that a representation of said indication is output at least one of the first communication device and the second communication device, when attempting to establish a communication session between the first communication device and the second communication device.

9. The method of claim 8, wherein said indication comprises an identifier of a user associated with at least one of the first communication device and the second communication device.

10. The method of claim 8, wherein said indication further comprises a map depicting at least one of said first location and said second location.

11. The method of claim 3, wherein at least one of said determining said first location and determining said second location is based on at least one of link layer data, GPS data, RF triangulation data, user data, wireless access point data and location data stored in a database.

12. The method of claim 3, wherein determining if said first location and said second location are in proximity to each other comprises determining if said first location and said second location are co-located.

13. The method of claim 12, wherein determining if said first location and said second location are co-located comprises determining if said first location and said second location are co-located in at least one of the same physical domain, the same room, the same floor, the same building, the same civic address.

* * * * *